(12) United States Patent
Wyatt et al.

(10) Patent No.: US 11,332,168 B2
(45) Date of Patent: May 17, 2022

(54) RAIL TRANSPORT SYSTEM

(71) Applicant: BULK ORE SHUTTLE SYSTEM PTY LTD, South Perth (AU)

(72) Inventors: Stephen Wyatt, South Perth (AU); David De Haas, Maida Vale (AU)

(73) Assignee: BULK ORE SHUTTLE SYSTEM PTY LTD, South Perth (AU)

(*) Notice: Subject to any disclaimer, the term of this patent is extended or adjusted under 35 U.S.C. 154(b) by 319 days.

(21) Appl. No.: 16/098,902

(22) PCT Filed: May 5, 2017

(86) PCT No.: PCT/AU2017/050416
§ 371 (c)(1),
(2) Date: Nov. 5, 2018

(87) PCT Pub. No.: WO2017/190198
PCT Pub. Date: Nov. 9, 2017

(65) Prior Publication Data
US 2019/0168784 A1    Jun. 6, 2019

(30) Foreign Application Priority Data

May 6, 2016 (AU) ............................... 2016901686
May 10, 2016 (AU) ............................... 2016901741

(51) Int. Cl.
*B61D 49/00* (2006.01)
*B65G 67/42* (2006.01)
(Continued)

(52) U.S. Cl.
CPC ............... *B61D 49/00* (2013.01); *B61C 3/00* (2013.01); *B61C 13/04* (2013.01); *B61D 3/00* (2013.01);
(Continued)

(58) Field of Classification Search
CPC ... B61D 9/00; B61D 9/04; B61D 9/06; B61D 11/00; B61D 3/10; B61D 47/00; B61D 47/005
See application file for complete search history.

(56) References Cited

U.S. PATENT DOCUMENTS 1,688,657 A    10/1928 Repper
2,393,695 A    1/1946 Kling
(Continued)

FOREIGN PATENT DOCUMENTS

AU    2015200258    2/2015
DE    10249714 A1    5/2004
(Continued)

OTHER PUBLICATIONS

Eurasian Patent Office Action for Application No. 201892120/31 dated Nov. 25, 2019 (7 pages including English translation).
(Continued)

*Primary Examiner* — Robert J McCarry, Jr.
(74) *Attorney, Agent, or Firm* — Michael Best & Friedrich LLP

(57) ABSTRACT

A rail transport system 10 has at least two load carrying bodies 12 which are arranged end to end. Mutually adjacent bodies 12 are coupled together by respective coupling systems 14. The rail transport system 10 further includes a plurality of axles 16 each provided at opposite ends with respective rail wheels 18 which support the bodies 12. A flexible liner 20 is supported by the bodies 12. The liner 20 is configured to span respective coupling systems 14. In this way the bodies 12 and the flexible liner 20 form a continuous load carrying structure 22. The continuous load carrying structure 22 is arranged so as to be able to pivot about an axis perpendicular to the axles 16 to facilitate unloading of cargo from the bodies 12.

22 Claims, 18 Drawing Sheets

(51) Int. Cl.
  *B61F 3/04*   (2006.01)
  *B61D 9/14*   (2006.01)
  *B61D 3/00*   (2006.01)
  *B61D 11/00*  (2006.01)
  *B61D 9/00*   (2006.01)
  *B61C 13/04*  (2006.01)
  *B61C 3/00*   (2006.01)
  *B61D 15/00*  (2006.01)

(52) U.S. Cl.
  CPC ................ *B61D 9/00* (2013.01); *B61D 9/14* (2013.01); *B61D 11/00* (2013.01); *B61D 15/00* (2013.01); *B61F 3/04* (2013.01); *B65G 67/42* (2013.01); *Y02T 30/00* (2013.01)

(56) References Cited

U.S. PATENT DOCUMENTS

| | | | |
|---|---|---|---|
| 2,462,666 A | 2/1949 | Omar | |
| 3,480,321 A | 11/1969 | Brandt et al. | |
| 4,597,337 A | 7/1986 | Willetts | |
| 4,754,710 A | 7/1988 | Kieres | |
| 5,730,064 A | 3/1998 | Bishop | |
| 2008/0190318 A1* | 8/2008 | Palais | B61D 3/10 105/3 |
| 2010/0054898 A1 | 3/2010 | Medel et al. | |
| 2010/0114404 A1 | 5/2010 | Donnelly | |
| 2010/0218700 A1* | 9/2010 | Aaron | B61D 9/00 105/261.1 |
| 2013/0189058 A1* | 7/2013 | Bolsoy | B61D 9/14 414/425 |
| 2013/0206742 A1* | 8/2013 | Brueckert | H05B 6/101 219/136 |

FOREIGN PATENT DOCUMENTS

| | | |
|---|---|---|
| DE | 112009000648 T5 | 2/2011 |
| GB | 762259 | 11/1956 |
| JP | S63195059 A | 8/1988 |
| JP | H06072330 A | 3/1994 |
| JP | H08268277 A1 | 10/1995 |
| JP | H0885451 A | 4/1996 |
| JP | 2013032092 A | 2/2013 |
| JP | 2014192928 A | 10/2014 |
| RU | 2650282 C1 | 4/2018 |
| SU | 1343727 | 2/1990 |

OTHER PUBLICATIONS

International Search Report for Application No. PCT/AU2017/050416 dated Jul. 25, 2017 (6 pages).

International Preliminary Report on Patentability for Application No. PCT/AU2017/050416 dated Jun. 20, 2018 (21 pages).

Korean Intellectual Property Office Notice of Non-final Rejection for Application No. 10-2018-7035498 dated Nov. 20, 2020 (17 pages including English translation).

English Translation of Japanese Patent Office Notification of Reason(s) for Refusal for Application No. 2019-510728 dated Feb. 24, 2021 (7 pages).

* cited by examiner

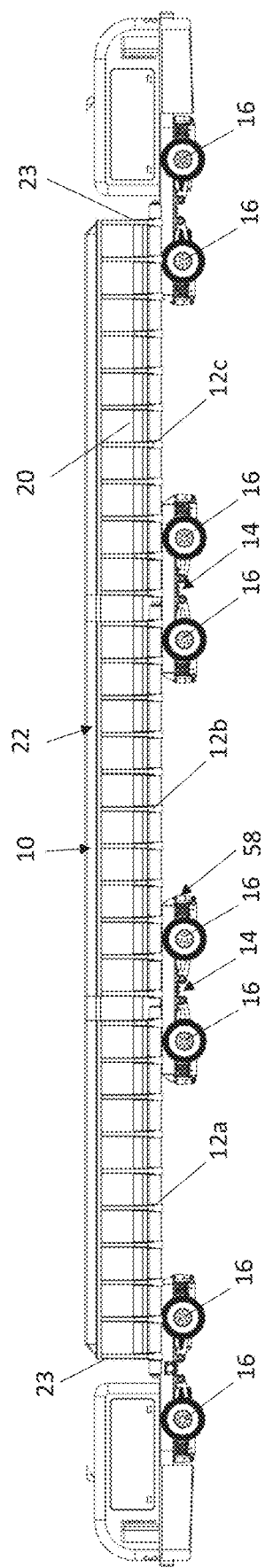

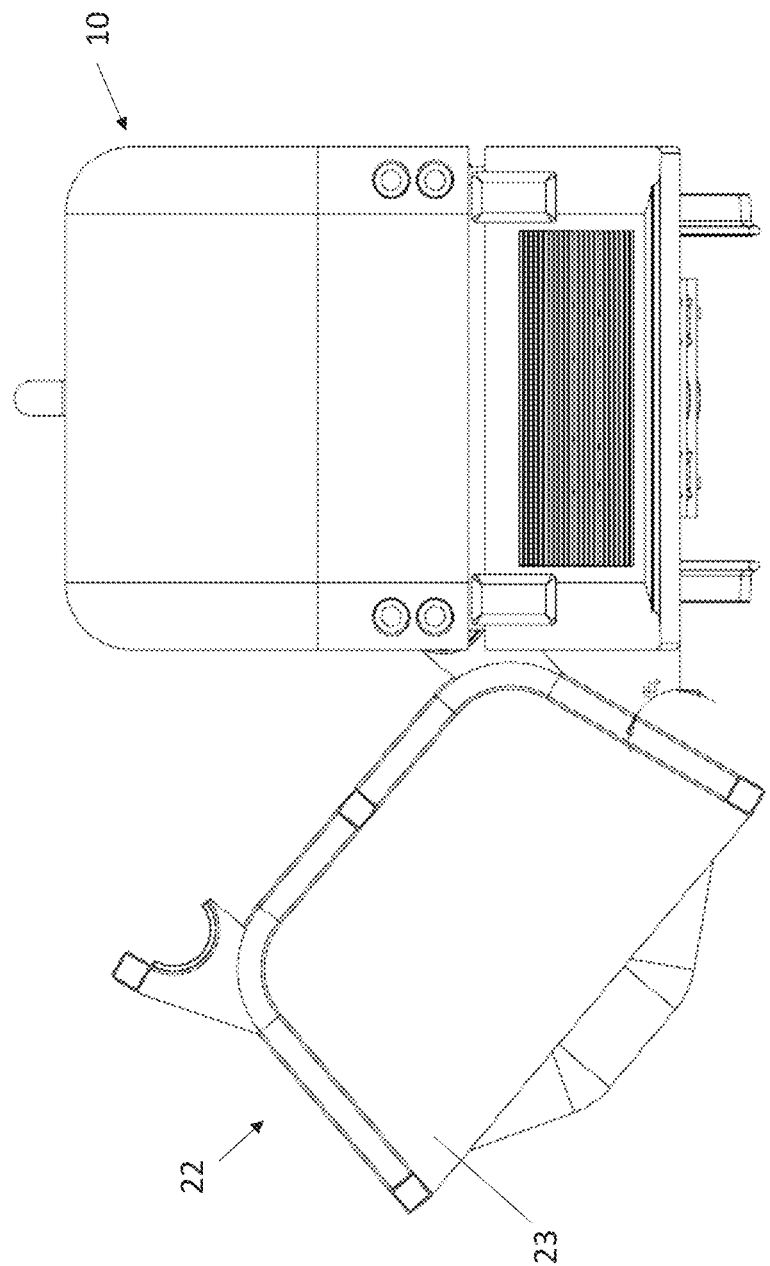

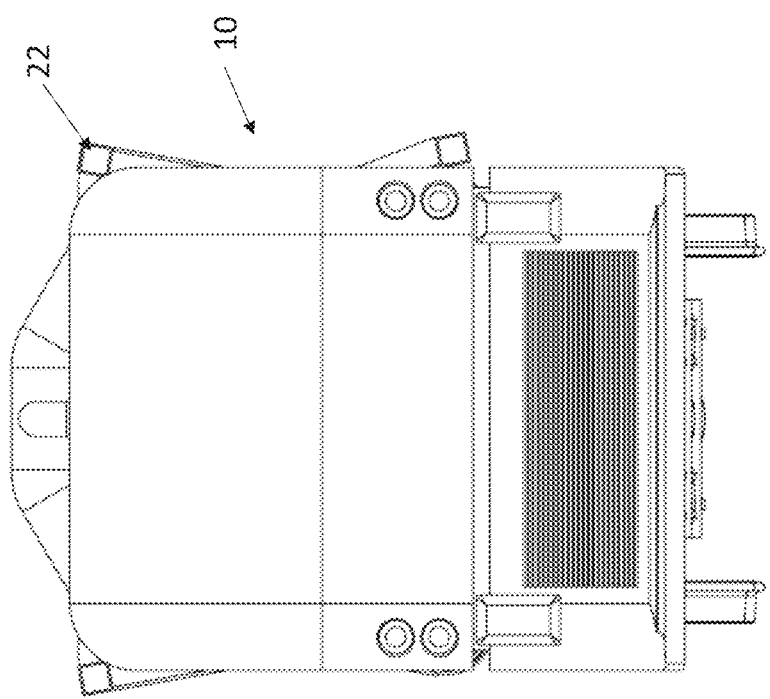

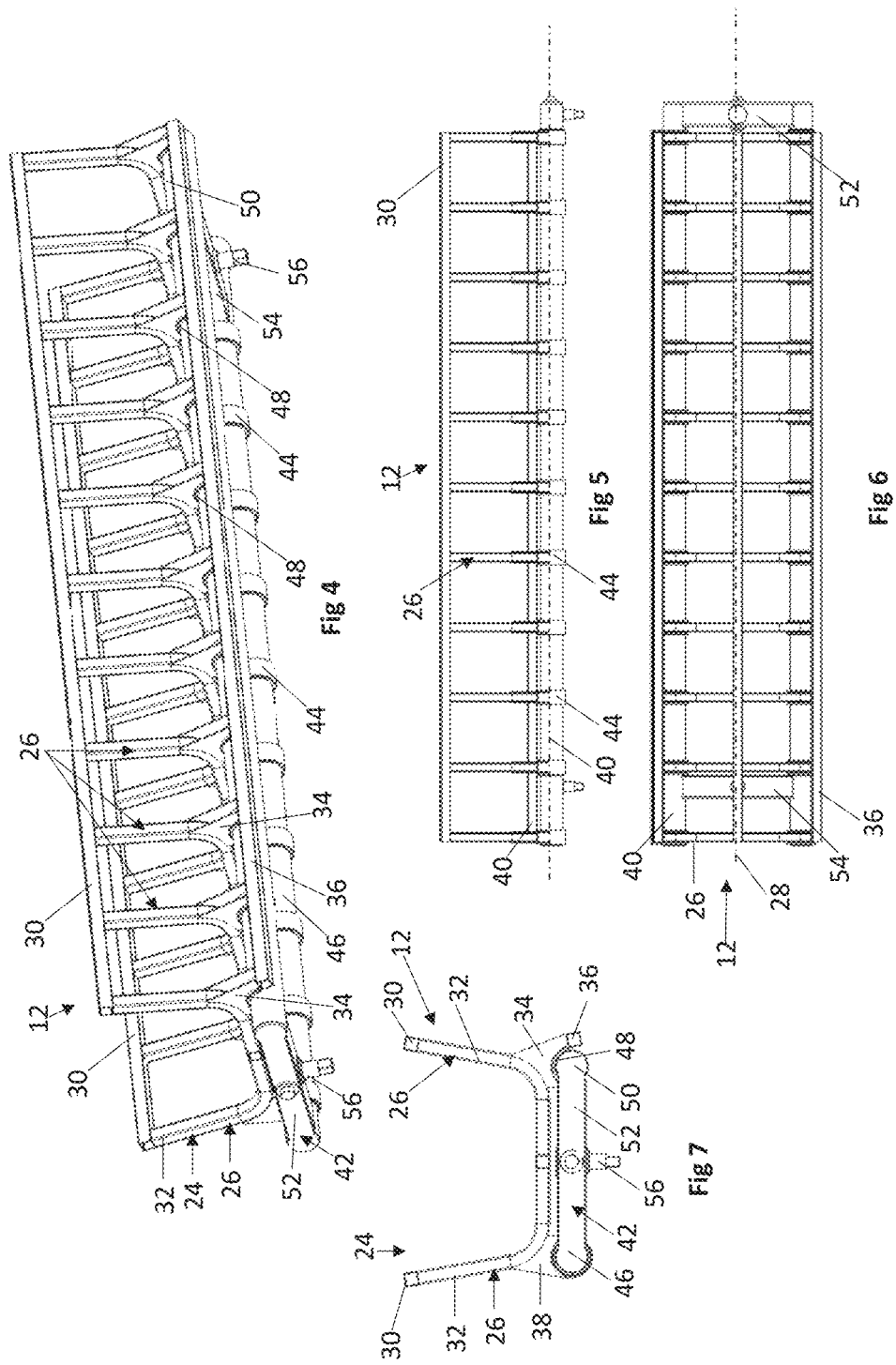

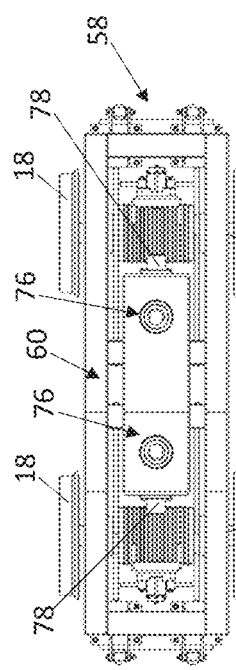
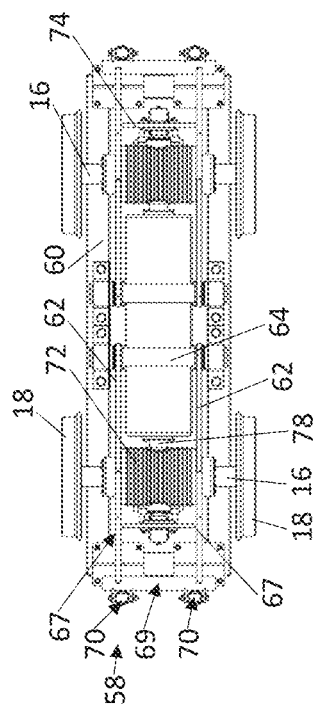
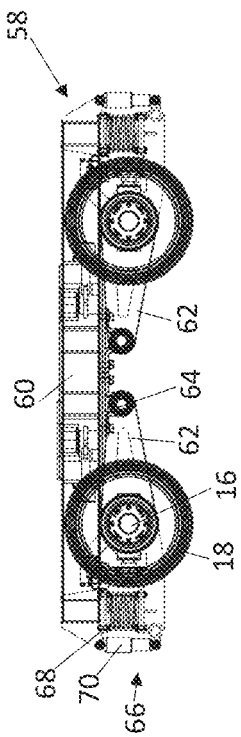
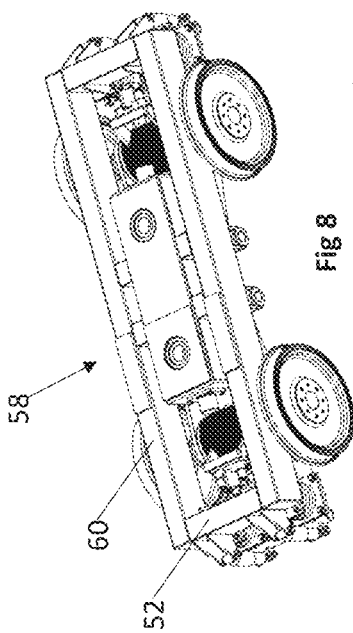
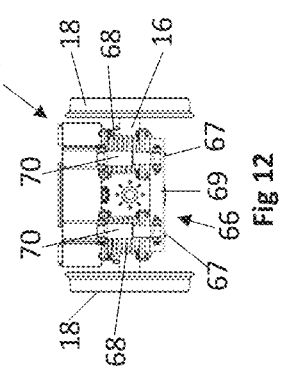

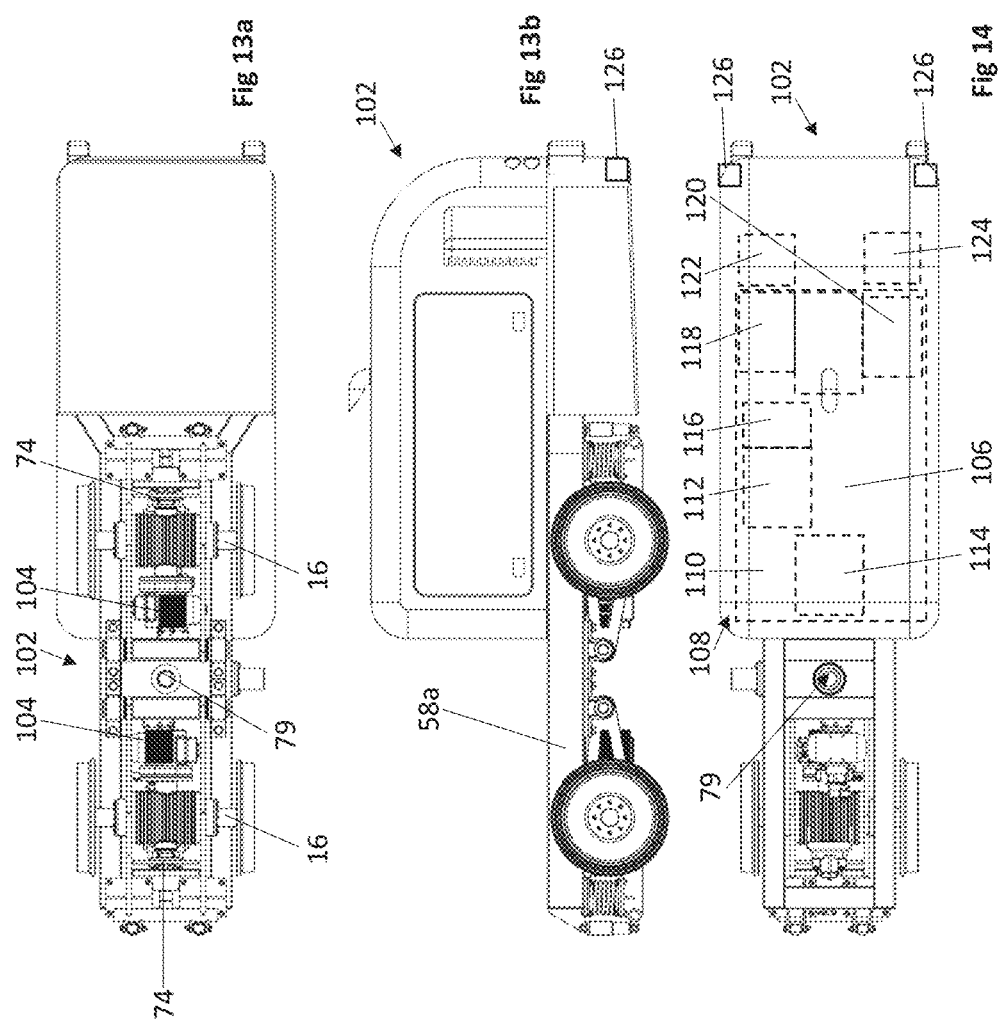

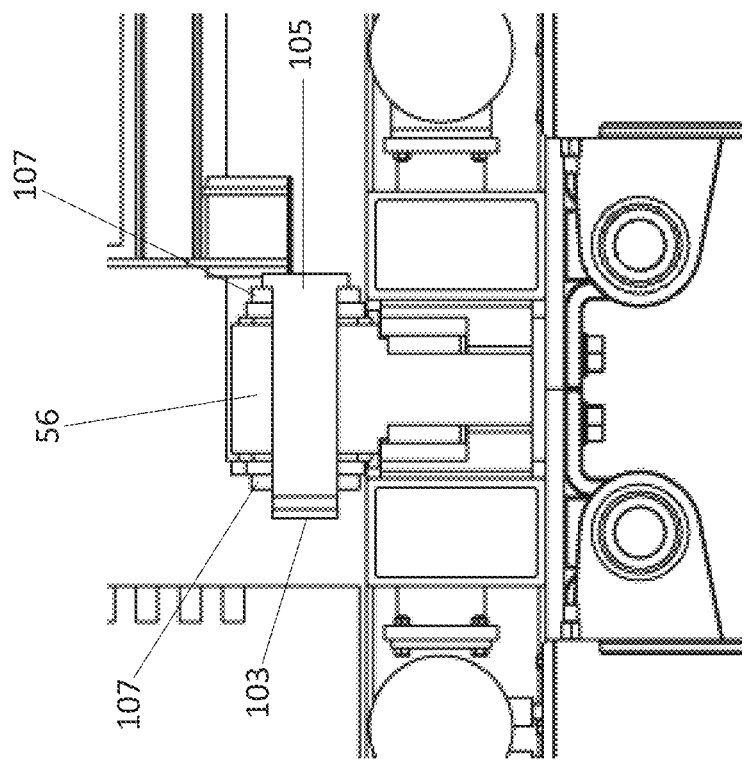

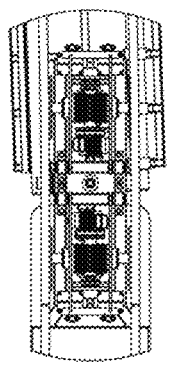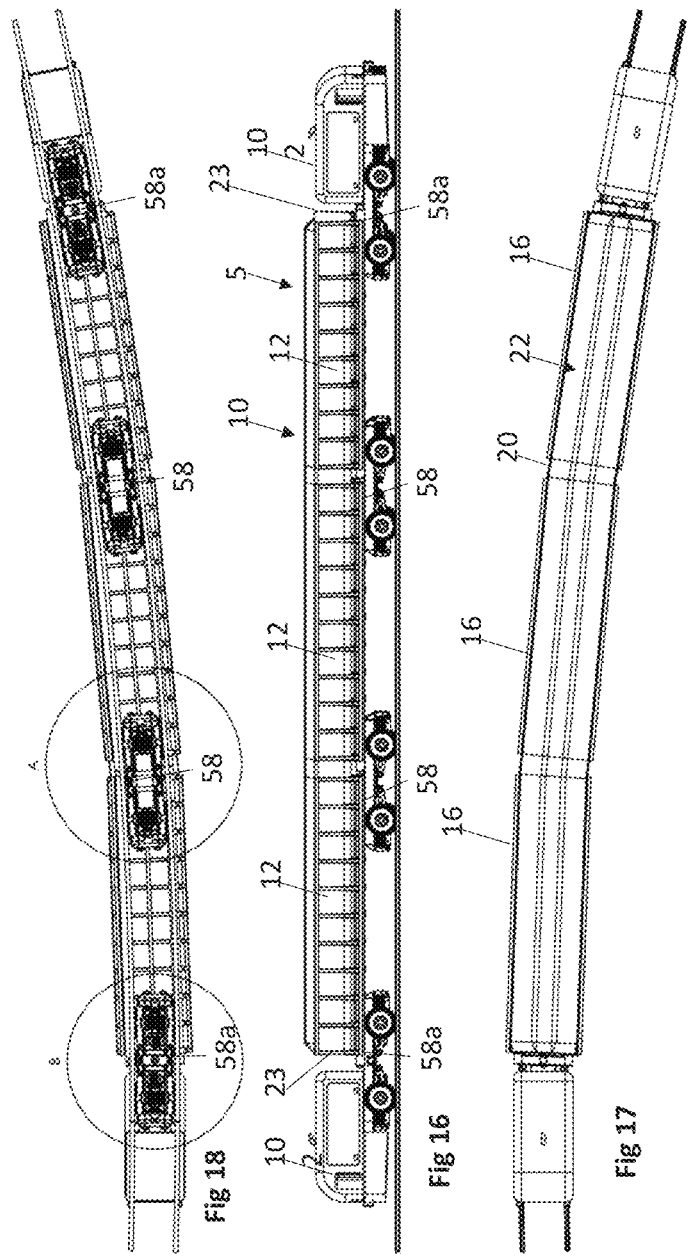

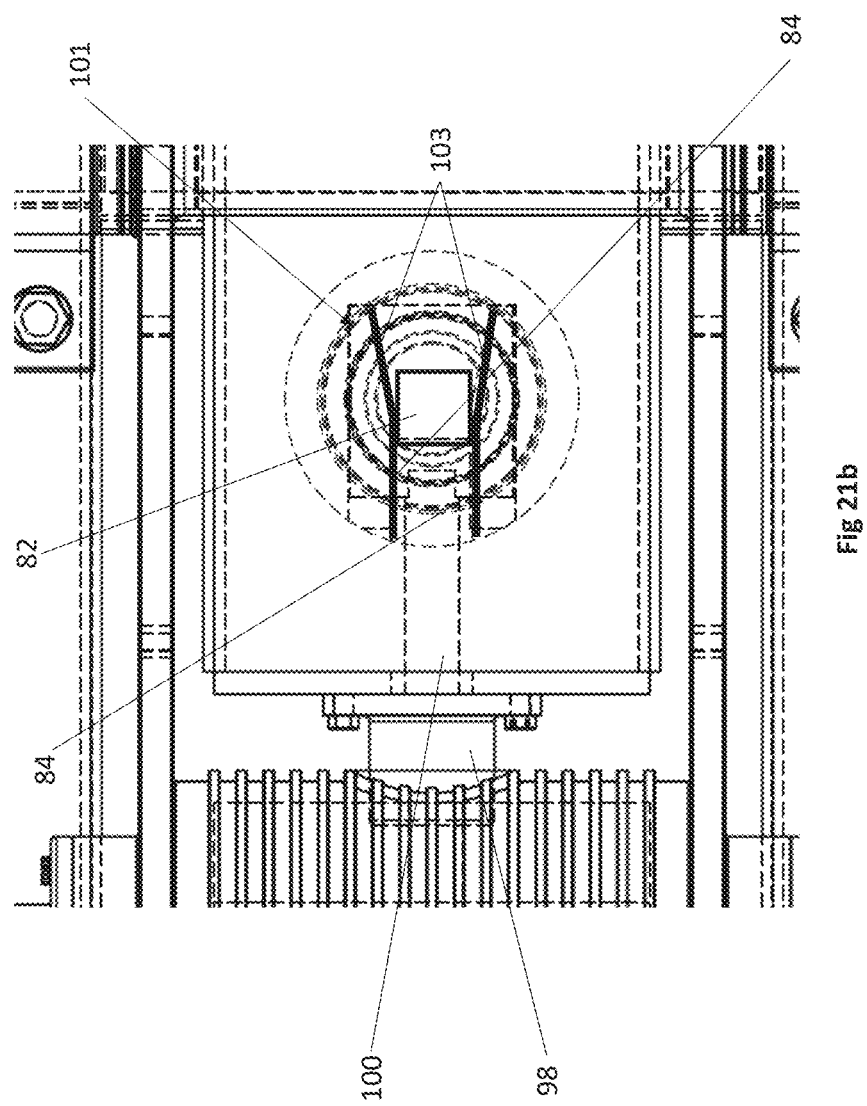

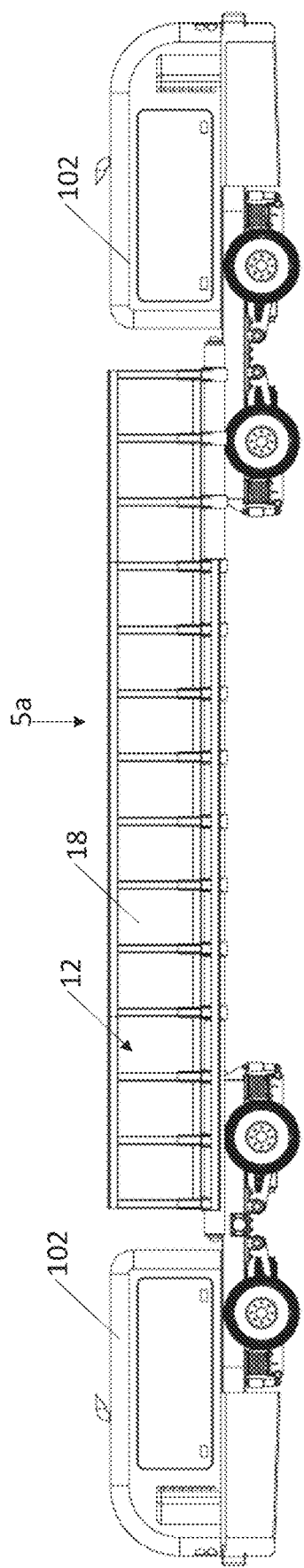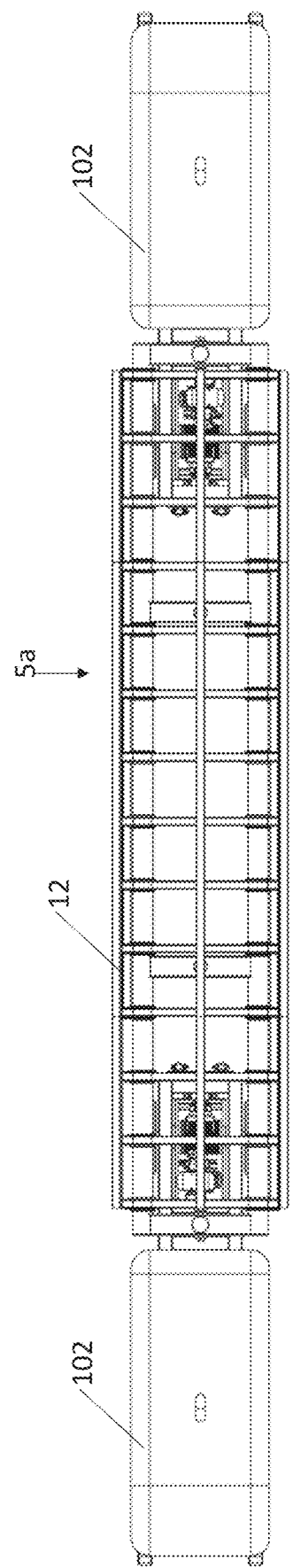

RAIL TRANSPORT SYSTEM

TECHNICAL FIELD

A rail transport system is disclosed particularly although not exclusively for transporting bulk commodities. Also disclosed are apparatuses, methods and systems that may be incorporated in the rail transport system to facilitate autonomous or remotely controllable rail transport.

BACKGROUND ART

Environmental, safety and economic concerns have motivated many developments in rail transport. This includes the development of autonomous or remotely controlled rail vehicles. Such rail vehicles have found application in for example: heavy haulage of bulk commodities such as ore; and transit of people on dedicated single route tracks for example between terminals in an airport. Such systems are characterised by the provision of one or more locos which are connected to pull and/or push a plurality of freewheeling wagons or rail cars. Commonly locomotives are powered by: an on board diesel engine; a combination of an on board diesel engine and electric motors; or an electric motor powered by connection to an external power source such as overhead electrified cable or a track mounted bus bar.

Consist instability around bends and the associated risk of derailment is a safety concern to the rail industry. This is due in part to shunting between adjacent coupled wagons in a consist arising from the very nature of the coupling between wagons. Common couplings comprise engaging mechanical parts and mutually engageable buffers that inherently provide a degree of slack or travel between adjacent coupled wagons.

Wheel rail riding is currently employed by the railway industry to accommodate for wheel speed variance associated with the traditional fixed shaft wheel arrangement of rail vehicles traversing a bend. Wheel rail riding is facilitated by machining the rail wheels with a frusto-conical circumferential surface providing a variance in radius of the rail wheels along their rotation axis. Flanges are provided on the large radius end of the wheels. The flanges engage the gauge side of the rail to assist in maintaining the rail wheels on the rail when traversing a bend.

Using current rail technology the length of a consist is often limited by the power and traction capability of the locos and the pulling and shunting capacity of the rail wagons and associated couplings. As a consequence current rail technology generally limits the maximum grade or incline of a track to no more than 1.5%. It is known for example with heavy haul operations to additionally hitch one or more banker locos to assist in pushing a consist up an incline.

The above reference to the background art does not constitute an admission that the art forms a part of the common general knowledge of a person of ordinary skill in the art. Further, the above reference is also not intended to limit the application of the apparatus method and system as disclosed herein.

SUMMARY OF THE DISCLOSURE

In one aspect there is disclosed a rail transport system comprising:
at least two bodies arranged end to end, wherein mutually adjacent bodies are capable of being coupled together by a respective coupling system;
a plurality of axles each provided with a rail wheel at each end on which the at least two bodies are supported; and
a flexible liner supported by the at least two bodies and configured to span respective coupling systems coupling mutually adjacent bodies to form a continuous load carrying structure.

In one embodiment each body comprises a liner support structure in which the flexible liner is received, the liner support structure being open at respective opposite ends to enable the flexible liner to extend beyond the opposite ends of the liner support structure.

In one embodiment the liner support structure comprises a plurality of substantially U-shaped ribs which lie in respective planes transverse to a longitudinal axis of a corresponding body.

In one embodiment the liner support structure is arranged to enable the liner support structure to be pivoted about an axis perpendicular to the axles to facilitate unloading of the bodies.

In one embodiment the wheels at each end of a common axle are capable of rotation at different speeds to each other.

In one embodiment the rail transport system comprises a driven first rail vehicle the first rail vehicle configured to be coupled by a respective coupling system to a first of the bodies and having at least one motor and at least two wheels wherein the at least one motor is coupled to the at least two wheels to impart torque to the at least two wheels in a manner which enables the wheels to rotate at different speed to each other.

In one embodiment the rail transport system comprises a driven second rail vehicle the second rail vehicle configured to be coupled by a respective coupling system to a last of the bodies, the last of the bodies being a most distant of the at least two bodies from the first body, the second rail vehicle having at least one motor and at least two wheels wherein the at least one motor is coupled to the at least two wheels to impart torque to the at least two wheels in a manner which enables the wheels to rotate at different speed to each other.

In one embodiment the coupling system is an articulating coupling system being configured to provide three degrees of rotational freedom and no degrees of translational freedom between mutually coupled bodies or mutually coupled bodies and rail vehicles.

In one embodiment the coupling system further comprises a control mechanism operable to dampen or lockout at least one of the rotational degrees of freedom.

In one embodiment each coupling system comprises a pin connected to the body and a bush arrangement for receiving a respective pin.

In one embodiment the plurality of axles are arranged in respective trucks, each truck having at least one axle and wherein adjacent ends of mutually adjacent bodies are coupled to a common truck.

In one embodiment the plurality of axles are arranged in respective trucks, each truck having at least two axle and wherein adjacent ends of mutually adjacent bodies are coupled to a common truck in the configuration wherein at least one axles is located below one of the mutually adjacent bodies and another axle is located below the other of the mutually adjacent bodies.

In one embodiment each truck comprises two bush arrangements.

In one embodiment the bush arrangements are located between two of the at least two axles.

In one embodiment the first rail vehicle comprises at a first axle and a second axle each axle having a rail wheel at each of opposite end; and a single bush arrangement located between the first axle and the second axle wherein a portion of a load of the first body is transferred to the first rail vehicle.

In one embodiment the second rail vehicle comprises a first axle and a second axle each axle having a rail wheel at each of opposite end; and a single bush arrangement located between the first axle and the second axle wherein a portion of a load of the last body is transferred to the second rail vehicle.

In one embodiment the motor comprises an electric motor.

In one embodiment each rail vehicle comprises an electric motor and a battery pack for providing power to the electric motor.

In one embodiment each rail vehicle comprises at least one fuel powered generator capable of charging the battery pack.

In one embodiment one or both of the first and second rail vehicles is provided with a control system arranged to enable autonomous driving of the corresponding rail vehicle.

In a second aspect there is disclosed a rail transport system comprising: a single load carrying body; first and second driven rail vehicles; and first and second coupling systems, wherein the first driven rail vehicle is coupled to one end of the single load carrying body by the first coupling system and the second driven rail vehicle is coupled to a second opposite end of the single load carrying body by the second coupling system; the first and second rail vehicles arrange to enable the rail transport system to be driven in opposite directions without turning of the single load carrying body, and wherein the full load of the single load carrying body and any payload held therein is transferred to first and second driven rail vehicles In one embodiment the coupling system is an articulating coupling system being configured to provide three degrees of rotational freedom between mutually coupled bodies or mutually coupled bodies and rail vehicles.

In a third aspect there is disclosed a rail transport shuttle comprising:
a load carrying structure having at least one load carrying body and a flexible liner supported by the at least one load carrying body;
first and second driven rail vehicles;
first and second coupling systems, wherein the first driven rail vehicle is coupled to one end of the load carrying structure by the first coupling system and the second driven rail vehicle is coupled to a second opposite end of the load carrying structure by the second coupling system;
the first and second rail vehicles arranged to enable the rail transport system to be driven in opposite directions without turning of the single load carrying body; and
wherein each coupling system is an articulating coupling system being configured to provide three degrees of rotational freedom between the opposite ends of the load carrying structure and the first and second driven rail vehicles.

In one embodiment of the second and third aspects coupling system may comprise a locking pin arranged to lock the opposite ends of the load carrying structure from motion in a vertical direction relative to the rail vehicles.

Each coupling system may further comprise a control mechanism operable to dampen or lockout at least one of the rotational degrees of freedom.

Each coupling system comprises a pin connected to the body and a bush arrangement for receiving a respective pin.

In one embodiment the load carrying structure may comprise two or more load carrying bodies arranged end to end, and one or more trucks; each truck having two axles and two coupling. The load carrying bodies may have the same function and structure as described above in relation to the first aspect.

In a fourth aspect there is disclosed an off-loading facility for offloading a payload carried by a rail transport system in accordance with any one of the first to third aspects comprising at least one overhead curved beam each of which supports a driven trolley with a pivotally coupled hook, wherein the driven trolley is capable of traversing the curved been to enable the hook to engage a portion of the load carrying body or load carrying structure to facilitate pivoting of the load carrying body or load carrying structure enabling the payload to be tipped from the load carrying body or load carrying structure.

BRIEF DESCRIPTION OF THE DRAWINGS

Notwithstanding any other forms which may fall within the scope of the rail transport system as set forth in the Summary; specific embodiments will now be described, by way of example only, with reference to the covering drawings in which:

FIG. 1a is a side view of a first embodiment of the disclosed rail transport system;

FIG. 1b is an exploded view of the rail transport system shown in FIG. 1a;

FIG. 2 is an end view of the rail transport system showing an associated continuous load carrying structure in an unloading position;

FIG. 3 is an end view of the rail transport system showing that the associated continuous load carrying structure and a transport position;

FIG. 4 is a perspective view of a load carrying body incorporated in the rail transport system;

FIG. 5 is a side view of the load carrying body shown in FIG. 4;

FIG. 6 is a plan view of the load carrying body shown in FIG. 4;

FIG. 7 is an end view of the load carrying body shown in FIG. 4;

FIG. 8 is a perspective view of a truck incorporated in the rail transport system;

FIG. 9 is a plan view of the truck shown in FIG. 8;

FIG. 10 is a bottom view of the truck shown FIG. 8;

FIG. 11 is a side view of the truck shown FIG. 8;

FIG. 12 is an end view of the truck shown in FIG. 8;

FIG. 13a is a bottom view of a powered rail vehicle incorporated in the rail system;

FIG. 13b is a side view of the powered rail vehicle shown in FIG. 13a;

FIG. 14 is a plan view of the powered rail vehicle shown in FIG. 13a;

FIG. 15 is a partial cutaway view of a coupling system incorporated in the powered rail vehicle shown in FIG. 13a;

FIG. 16 is a side view of the disclosed rail transport system traversing a bend in a rail track;

FIG. 17 is a plan view of the rail transport system shown in FIG. 16;

FIG. 18 is a bottom view of the rail transport system shown in FIGS. 16 and 17;

FIG. 20 is a view of detail B shown in FIG. 18;

FIG. 21b is a section view of the coupling system in a X-Z plane of FIG. 21a;

FIG. 24 is a side view of a further aspect of the disclosed the disclosed rail transport system in the form of a shuttle;

FIG. 25 is a plan view of the shuttle shown in FIG. 24;

DETAILED DESCRIPTION OF PREFERRED EMBODIMENTS

Figure 1B:
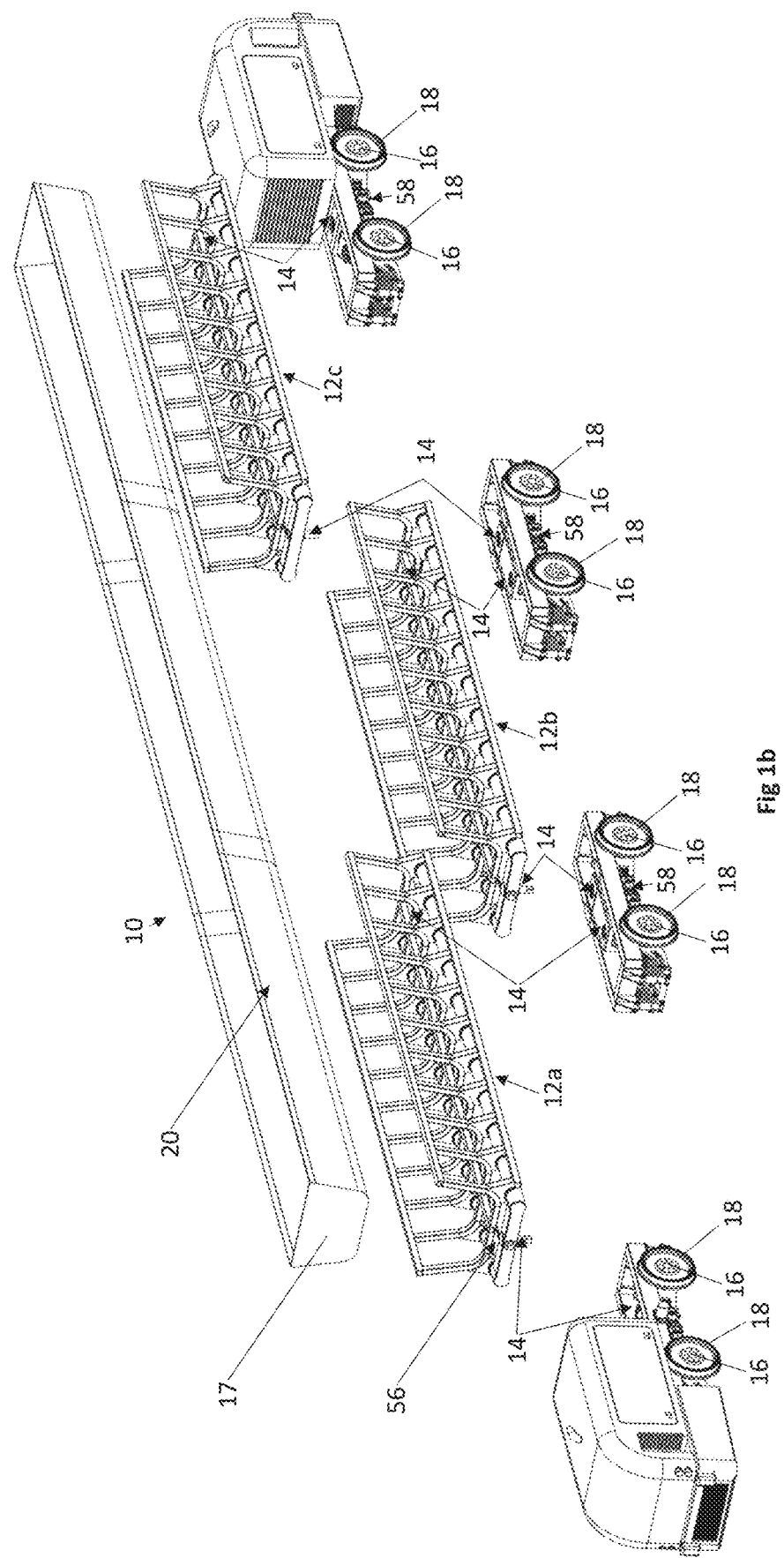
Figure 19:
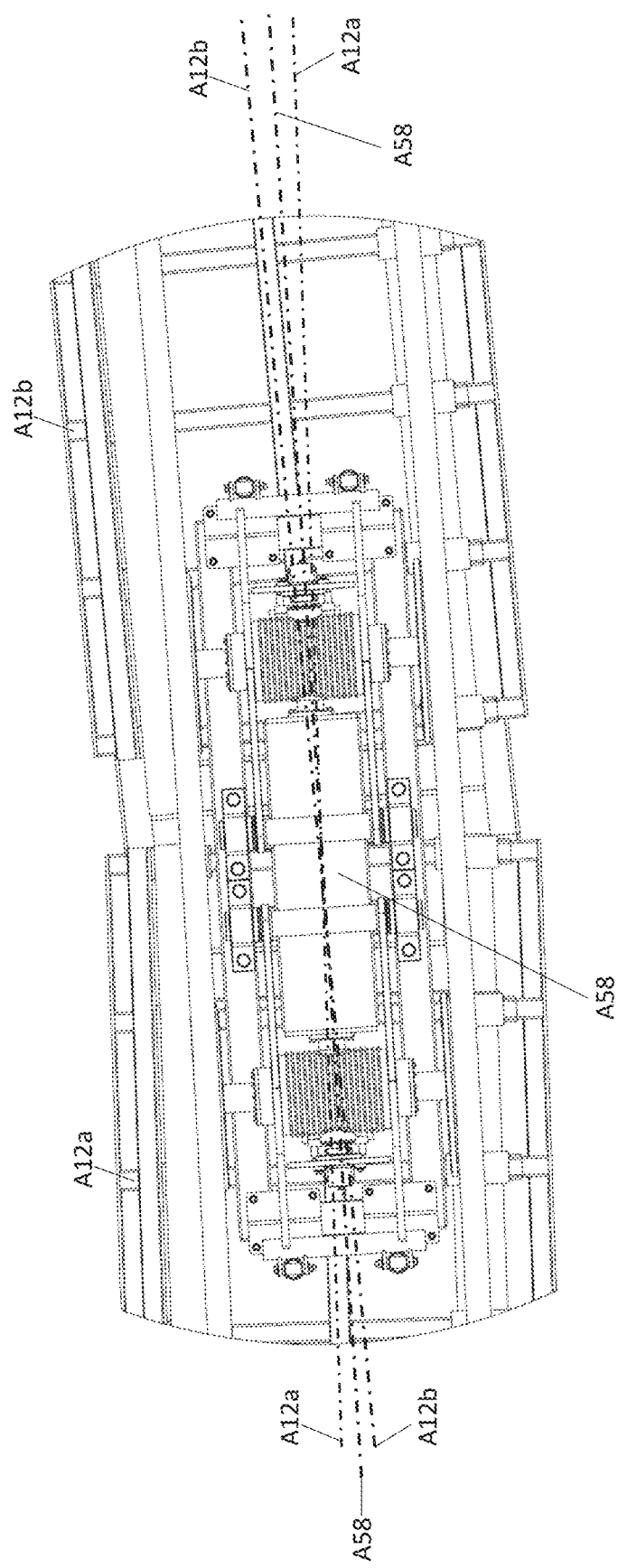
FIG. 19 is a view of detail A shown in FIG. 18.

FIGS. 1a and 1b illustrates a first embodiment of the disclosed rail transport system 10. In broad terms the rail transport system 10 comprises one or more (in this embodiment three) load carrying bodies 12a, 12b, 12c (hereinafter referred to in general as "bodies 12" in the plural or "body 12" in the singular) which are arranged end to end. Mutually adjacent bodies 12 are capable of being coupled together by respective coupling systems 14 (shown in most detail in FIG. 21). The rail transport system 10 further includes a plurality of axles 16 each provided at opposite ends with respective rail wheels 18 which support the bodies 12. A flexible liner 20 is supported by the bodies 12 and together the bodies and the flexible liner form a continuous load carrying structure 22. When the system 10 has two or more bodies the liner 20 is configured to span respective coupling systems 14. The continuous load carrying structure 22 extends continuously across and between mutually adjacent bodies 12 as may be best seen in FIG. 17. A portion of the liner at an end of the continuous load carrying structure may be conveniently provided with an end wall 23 (FIGS. 1a, 2) that extends across the sides of the liner to thereby close the end to prevent spillage of the material carried on the bodies 12.

The continuous load carrying structure 22 is arranged so as to be able to pivot about an axis perpendicular to the axles 16 to facilitate unloading of cargo from the bodies 12. FIG. 2 shows the rail transport system 10 with the load carrying structure 22 pivoted to an unloading position. During loading and transport of the cargo the load carrying structure 22 is in a transport position as shown in FIGS. 1 and 3.

With particular reference to FIGS. 4 to 7 each body 12 includes a liner support structure 24 in which the flexible liner 20 is received. The liner support structure 24 comprises a plurality of U-shaped ribs 26 which lie in respective planes transverse to a longitudinal axis 28 of the corresponding body 12. Respective upper rails 30a and 30b are connected to upwardly extending arms 32 of each U-shaped rib 26. Brackets 34 attached to one side of each U-shaped rib 26 and connected to a first common lower rail 36. Brackets 38 attached to an opposite side of each U-shaped rib 26 are attached to a second common lower rail 40.

The brackets 38 also pivotally couple the load carrying structure 22 to a chassis 42 of the corresponding body 12. In particular the brackets 38 terminated in circular bearings 44 that extend about a cylindrical side beam 46 along one side of the chassis 42. The circular bearings 44 enable the load carrying structure 22 to pivot about the beam 46 (which is parallel to the longitudinal axis 28) to the unloading position. The brackets 34 are formed with arcuate seats 48 that rest on a cylindrical side beam 50 on opposite side of the chassis 42 when the load carrying structure 22 is on the transport position. The chassis 42 is also provided with crossbars 52 and 54 at opposite ends which connect the beams 46 and 50 together. Extending downwardly from each of the crossbars 52 and 54 is a pin 56. Each pin 56 forms part of a corresponding coupling mechanism 14.

Referring to FIG. 1 and FIGS. 8-12 the axles 16 are arranged in respective trucks 58. In this embodiment each truck 58 has two axles 16. Rail transport system 10 is arranged so that a common truck 58 supports adjacent ends of mutually adjacent bodies 12. More particularly the axles 16 of a common truck 58 are arranged one below each of the mutually adjacent bodies 12. For example with particular reference to FIG. 1 bodies 12a and 12b each has an end supported on a common truck 58. One axle 16 of the truck 58 is below the body 12a while the other axle 16 of the same truck 58 is below the body 12b.

Each truck 58 has a rectangular frame 60 on which the axles 16 are supported. Each of two swing arms 62 have one end attached at spaced apart locations to a respective axle 16. An opposite end of each of the swing arms 62 is attached to via a pivot coupling 64 to the frame 60. This allows the axles to pivot or swing to a limited extend about the pivot couplings 64. A suspension system 66 comprising suspension arms 67, springs 68 and dampers 70 also connect the axles 16 to the frame 60. In particular two suspension arms 67 are attached at spaced apart locations to a common axle 16. The opposite ends of the suspension arms 67 are attached to a cross member 69. The springs 68 in the dampers 70 coupled between the cross member 69 and the frame 60.

A differential 72 is coupled to the axle 16 to enable each of the wheels 18 on a common axle 16 to rotate at different speed to each other. The truck 58 is also provided with a braking system 74 for each differential 72. Braking force applied by the braking system 74 is multiplied by the differential ratio to the wheels 18.

Each truck 58 also supports two articulating assemblies 75. The articulating assemblies may take different forms including: a spherical bush; an articulating turntable; or, some other type of articulating assembly. In this embodiment the articulating assembly 75 is a spherical bush assembly 76. Each bush assembly 76 together with a corresponding pin 56 constitute parts of the coupling system 14. The bush assemblies 76 are located between the axles 16 on a truck 58.

Figure 21A:
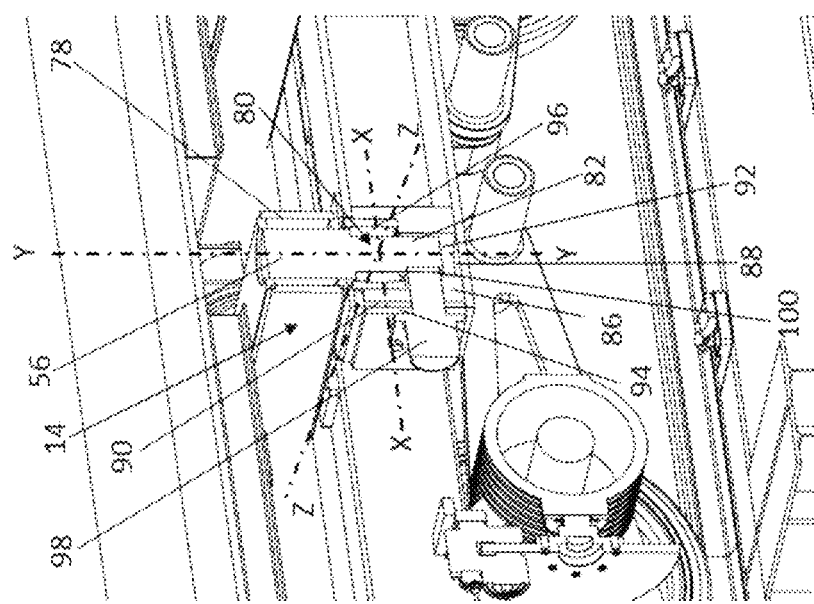
FIG. 21a is a partial cut away view of a coupling system incorporated in the disclosed rail transport system.

FIGS. 21a-and 21b provide a schematic representation of the coupling system 14. As previously mentioned the coupling system 14 comprises the pin 56 which is fixed to a body 12 and a bush assembly 76 supported by a truck 58. The pin 56 has a head 78 that is fixed to a corresponding crossbar 52 or 54 of a body 12, a coaxial and reduced diameter cylindrical portion 80 and a contiguous locking tail section 82. The tail section 82 has one or more planar faces 84. Most conveniently the tail section 82 may be formed with a square cross-sectional shape.

The bush assembly 76 comprises a bush housing 86 with an axial passage 88 having an upper larger diameter portion 90 and a lower reduced diameter portion 92. An outer bush 94 is seated in the portion 90 while an inner bush 96 is seated in the outer bush 94. The outer surface of the inner bush 96 and the inner surface of the outer bush 94 of a spherical and complimentary shape. When the pin 56 is inserted into the bush assembly 76 the cylindrical portion 80 is disposed in the inner bush 96 with the minimal clearance, while the tail section 82 is disposed in the lower reduced diameter portion 92. There is an annular space or clearance 94 between the outer surface of the tail section 82 and the inner surface of the portion 92 of the axial passage 88.

The coupling system 14 provides three rotational degrees of freedom of movement between a body 12 and a coupled truck 58. The three degrees of freedom of movement comprise pitch, yaw and roll motion about X, Y and Z axes respectively shown in FIG. 21a superimposed on a pin 56. The Y axis corresponds with a central axis of the pin 56, the X axis extend perpendicular to the longitudinal axis 28 while the Z axis extend parallel to the axles 16. The pitch and roll motion is limited by the annular space or clearance 94. Due to the limited clearance between the cylindrical portion 80 and the inner bush 96 there is an essence no translational degree of freedom provided by the coupling system 14.

The coupling system 14 also includes a control mechanism 98 that is operable to dampen or lockout at least one of the degrees of freedom. More particularly in this embodiment the control mechanism 98 can selectively either (a) partially dampen rotation around the x, y and z axis; (b) rigidly couple all movement, that is locks all of the three rotational degrees of freedom of motion; or (c) only allow pitch movement about the z axis. The control mechanism 98 includes a shaft 100 provided with a fork arrangement 101 shown in FIG. 21b that can be linearly moved into contact with a planar face 84 of the tail section 82. The fork arrangement 101 has a forward section with tapered mutually facing surfaces 103. The taper is arranged so that the space between the surfaces reduces in a direction toward the shaft 100. The control mechanism can advance or retract the shaft 100 to control the degree of confinement applied by the fork arrangement 101 on the tail section 82 of the pin 56 to thereby provide the control over the degrees of rotational freedom as described above.

Referring back to FIG. 1 and FIGS. 13a-15 the rail transport system 10 in this embodiment also includes two driven or powered rail vehicles 102a and 102b (hereinafter referred to in general as "powered rail vehicles 102"). The rail system 10 in combination with the one or both of the powered rail vehicles 102 may be considered to form a self-powered articulated shuttle S. Each powered rail vehicle 102 comprises a truck 58a which is similar to the trucks 58 with the exception that the truck 58a comprises electric motors 104 to provide torque to each of the axles 16 via the corresponding differential 72, and only a single articulating assembly 75 between the axles 16. Each axle 16 also has a mechanical brake 74 which operates to brake the differential 72.

In order to couple a body 12 to a rail vehicle 102 the pin 56 of the body 52 is inserted into the articulating assembly 75 of the rail vehicle 102. In order to ensure transfer of weight/load from the body 12 (or end of the load carrying structure 22) to the vehicle 102 a locking pin 105 (FIG. 15) is provided that is able to pass through the pin 56 and a bracket 107 which is fixed to the truck 58a. The engagement of the pin 105 prevents any substantial vertical movement of the pin 56 along the y axis. The locking of the pin 56 improves traction of the rail vehicle 102 and eliminates the need for ballast. This load transfer to the rails vehicles 102 is available at both ends of the load carrying structure 22 (which is the combination of the body(ies) 12 and liner 20). When the load carrying structure is a single body 12 and 20 (as in FIGS. 24 & 25 discussed later) then the entire load of the body 12 and its payload is transferred to the vehicles 102.

The coupling system 14 which comprises a combination of the pin 56, articulating assembly 75/bush assembly 76 and the control mechanism 98 provides the following benefits:

Articulation provided by the coupling system 14 can be locked to prevent the wheels 18 hunting when the rail system 10/shuttle S travel in a straight line.

The spherical bush assembly 76 has no translational play in a direction of travel of the load carrying bodies 12 and therefore mitigates shunting during starting and stopping allowing faster acceleration and deceleration as well as minimising derailment risk when traveling in a straight line or around bends under braking.

The inner and outer spherical bushes 94, 96 can be locked by the control mechanism 98 during straight line travel up and down grades, as well as during starting and deceleration events. This enables the articulated shuttle S to form a rigid unit and therefore totally eliminates shunting.

The two coupling systems 14 in each truck 58 can be released (i.e. the control mechanism 98 exerts no influence on the pin 56) to allow tight radius turning and subsequent reduced wheel wear. This is a benefit over a traditional single pivot wheel assembly support and reduces the flexing in the flexible liner 20.

The bush assemblies 78 can be slightly engaged or dampened by operation of the control mechanism 98 to stiffen articulation resistance for larger radius operation.

FIGS. 16-20 illustrates the relationship between the trucks 58 in the bodies 12 when the rail transport system 10 and associated shuttle S travel around a bend. The rotational freedom of movement provided by the coupling system 14 allows a truck 58 and the bodies 12 coupled to the truck 58 to be angularly offset relative to each other. This is illustrated most clearly in FIG. 19 which shows the angular relationship between the longitudinal axis A58 the truck 58, the longitudinal axis A12a of the body 12a and the longitudinal axis A12b of the body 12b. Additionally it will be recognised that the pivot point about the Y axis of the pin 66 is inboard of the end of an associated body 12. These attributes of the coupling system 14 provide a degree of self-steer of the bodies 12 as the shuttle S traverses a bend.

Returning to FIG. 14, the motors 104 of the rail vehicles 102 are powered by an electrical energy storage system which may take the form of a rechargeable battery pack 106. The vehicle 102 also comprises a battery range extender system 108 which operates to recharge the battery pack 106 while the vehicle 102 is in motion. In this particular embodiment the battery range extender system 108 comprises a fuel burning engine 110 which drives a generator or alternator 112. A fuel tank 114 is also supported by the truck 58a for holding a supply of fuel for the engine 110. Examples of fuels for the engine include but are not limited to: diesel, LNG and ethanol.

Electricity generated by the generator/alternator 112 is fed to a battery management system 116. The system 116 may condition the wave form of the current generated by the generator/alternator 58 prior to feeding to the rechargeable battery pack 106. The conditioning may include for example, but is not limited to, filtering, clipping, rectifying, and amplitude and/or frequency modulation or modification.

In addition to the mechanical brake 74 the vehicle 102 may be provided with a regenerative braking system. This may include but is not limited to a system that reverses the direction of rotation of the motors 104 to operate as generators which feed electricity back to the rechargeable battery pack 106 through the battery management system 116. Mechanical brake 74 can be controlled by an anti-lock braking system controller so that in effect the braking system for the vehicle 102 is an ABS braking system.

The vehicle 102 also includes a motor control unit (MCU) 118 and an on-board vehicle control unit (VCU) 120. The MCU 118 is dedicated to controlling the motors 104 which provide drive to the vehicle 102. The VCU 120 is responsible for overall control and supervision of the vehicle 102 and indeed the rail system 10 including the MCU 118. Accordingly the VCU 120 may be considered as the overall controller for the rail vehicle 102, rail system 10 and shuttle S.

A telemetry system 122 is also incorporated in the vehicle 102. The telemetry system 122 is operatively coupled with the VCU 120 and facilitates two way communications with external or remote devices, systems or manned control centers. A GPS system 124 is provided in the vehicle 102 to enable the location of the vehicle 102 to be determined.

Heat exchangers (not shown) may be mounted on the frame of the truck 58a to facilitate heat dissipation from various systems on the vehicle 102 including the motors 104 and the battery range extender system 108. The heat exchangers may also include an electric motor cooling hydraulic motor.

Each vehicle 102 is also provided with proximity sensors 126 near opposite ends of the chassis 16. The proximity sensors may for example be in the form of radars. These provide an indication of the proximity of the vehicle 102 to another object. The other object can be another vehicle 102 of another shuttle S. The radar can be provided as one, or a combination, of: a long range radar and a short/near range radar. The long range radar is used to provide autonomous dynamic fixed distance control between shuttles S. The short/near range radar provides a close expanded field of view making it possible to detect an object such as an animal entering or approaching the rail track.

A cowling 128 covers the battery range extender 108, generator/alternator 112, battery management system 116, MCU 118, the VCU 120, and the telemetry system 122. The cowling 128 is of an aerodynamic shape to reduce wind resistance and has a height and width's 10 she the same as that of the bodies 12.

Figure 22:
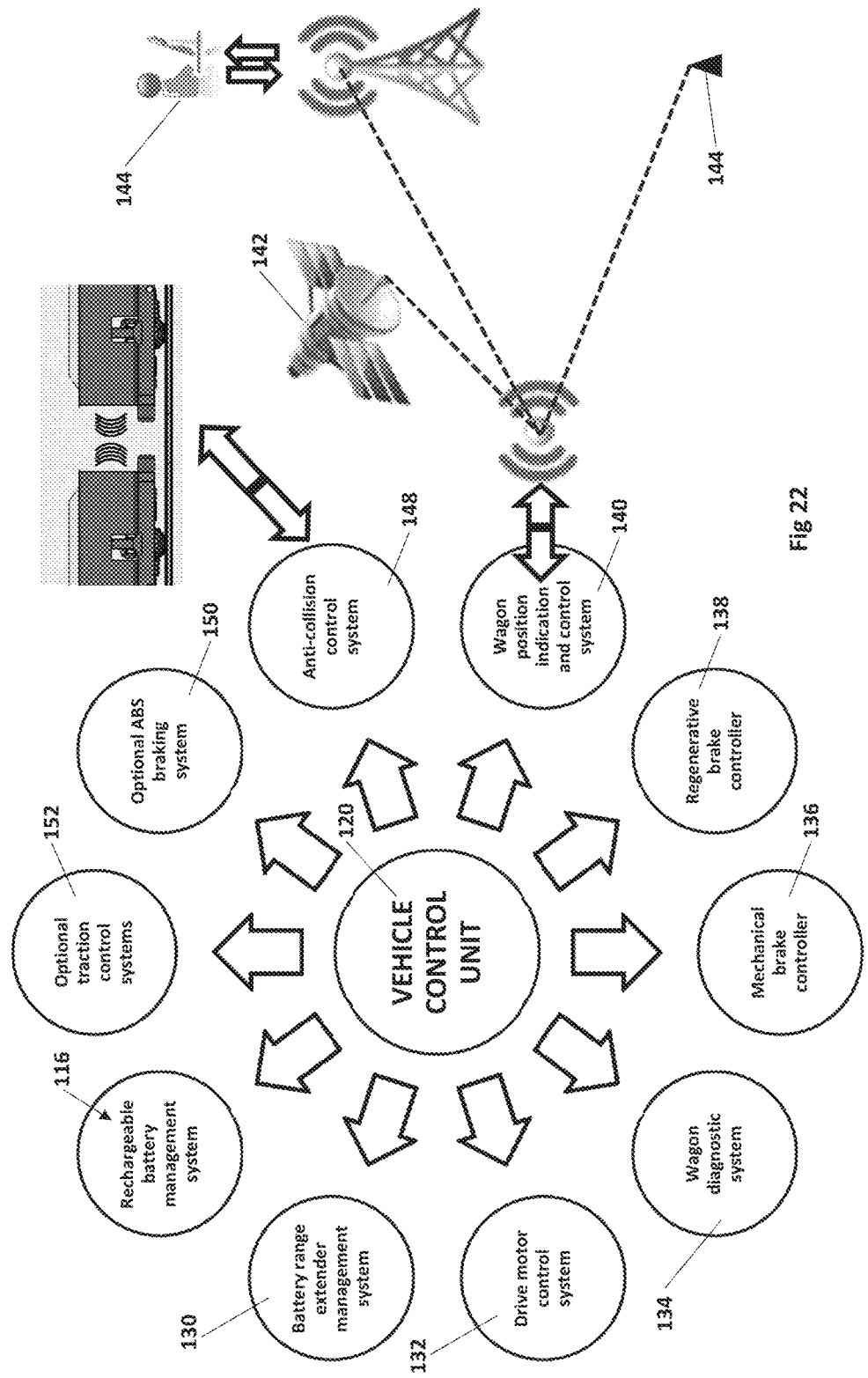
FIG. 22 is a schematic representation of a control system incorporated in an embodiment of the rail transport system.

FIG. 22 is a schematic representation of the VCU 120 depicting both its functionality and its interaction with external systems. The VCU 120 incorporates or otherwise interacts with the following systems:

(a) Rechargeable battery management system 116. The VCU 120 may be configured to control or otherwise interact with the rechargeable battery management system 116 to perform various management and monitoring functions. These include but are not limited to: monitoring the state of charge of the battery pack 106; monitoring the charge flowing to the battery pack 106; monitoring for discrepancies between expected and actual current flow in accordance with the load on the motors 104.

(b) Battery range extender management system 130. The system 130 may be: embedded as a software routine in the VCU 120; or provided a separate system in communication with the VCU 120. The battery range extender management system 130, under the control or supervision of the vehicle VCU 120, operates the battery extender system 108 to provide charge to the battery pack 106 when certain operational conditions exist. This may include for example a condition where the vehicle 102 is detected as travelling along an incline for a substantial distance and consequently the charge of the battery pack 106 is dropping to below a threshold level. In such circumstance the VCU 120 may instruct the battery range extender management system 130 to turn ON the engine 110 to recharge the battery pack 52.

(c) Drive motor control system 132. The system 132 may also be provided as a software routine within the VCU 120. Alternately it may be provided a separate system in communication with the VCU 120. In either event, the system 132 operates under the instruction of the VCU 120 to control the drive motors 104 in order for the vehicle 102 to travel in a desired manner. This may include for example: controlling the level of voltage to the motor 104 to control the speed of rotation of the motor 104; or the direction of rotation of the motor 104. Depending on the type of motor 104 used, the direction of rotation can be changed by incorporating a switch, controlled by the drive motor control system 132, to change the polarity of the driving voltage.

(d) Vehicle diagnosis system 134. The system 134 may be provided as a software routine within the VCU 120 or as a standalone module which is connected with the VCU 120. The wagon diagnosis system 134 may monitor characteristics such as vibration, g-force, wheel rotation for example in comparison to speed of rotation of the motor 104 to provide a possible indication of wheel sliding or wheel skipping; temperature of the heat exchanger and other devices such as the motor 104 and engine 110, fuel level in the tanks 112; and brake pad wear. The system 134 may send signals to the VCU 120 which in turn can decide to engage the rail vehicle's braking system to bring the vehicle 102 to a safe speed or to standstill to ensure the train stability or protect the vehicle 102/shuttle S and its payload from damage or any potential risk (e) Mechanical brake controller 136. The mechanical brake controller 136 may be a mechanical, hydraulic, pneumatic or electric device which is operated under the instruction of the VCU 120 to activate callipers of the mechanical brake 74. The VCU 120 may activate the controller 136 to retard the vehicle 102/shuttle S in various circumstances including but not limited to controlling speed when travelling along a decline, and controlling distance between a vehicle 102 and another shuttle S.

(f) Regenerative brake controller 138. The controller 138 may be embodied as a software routine within the VCU 120 or be provided as a separate unit which is mounted on the structure 16 and in communication with the VCU 120. The regenerative brake controller 138 is controlled by the VCU 120 to deploy or activate the regenerative brake when various operational conditions exist. In one example, which will be expanded on later, the VCU 120 may instruct the regenerative brake controller 138 to operate and provide a retarding force to the vehicle 102 in preference to instructing the mechanical brake controller 136 to operate the mechanical brake 74.

Figure 23:
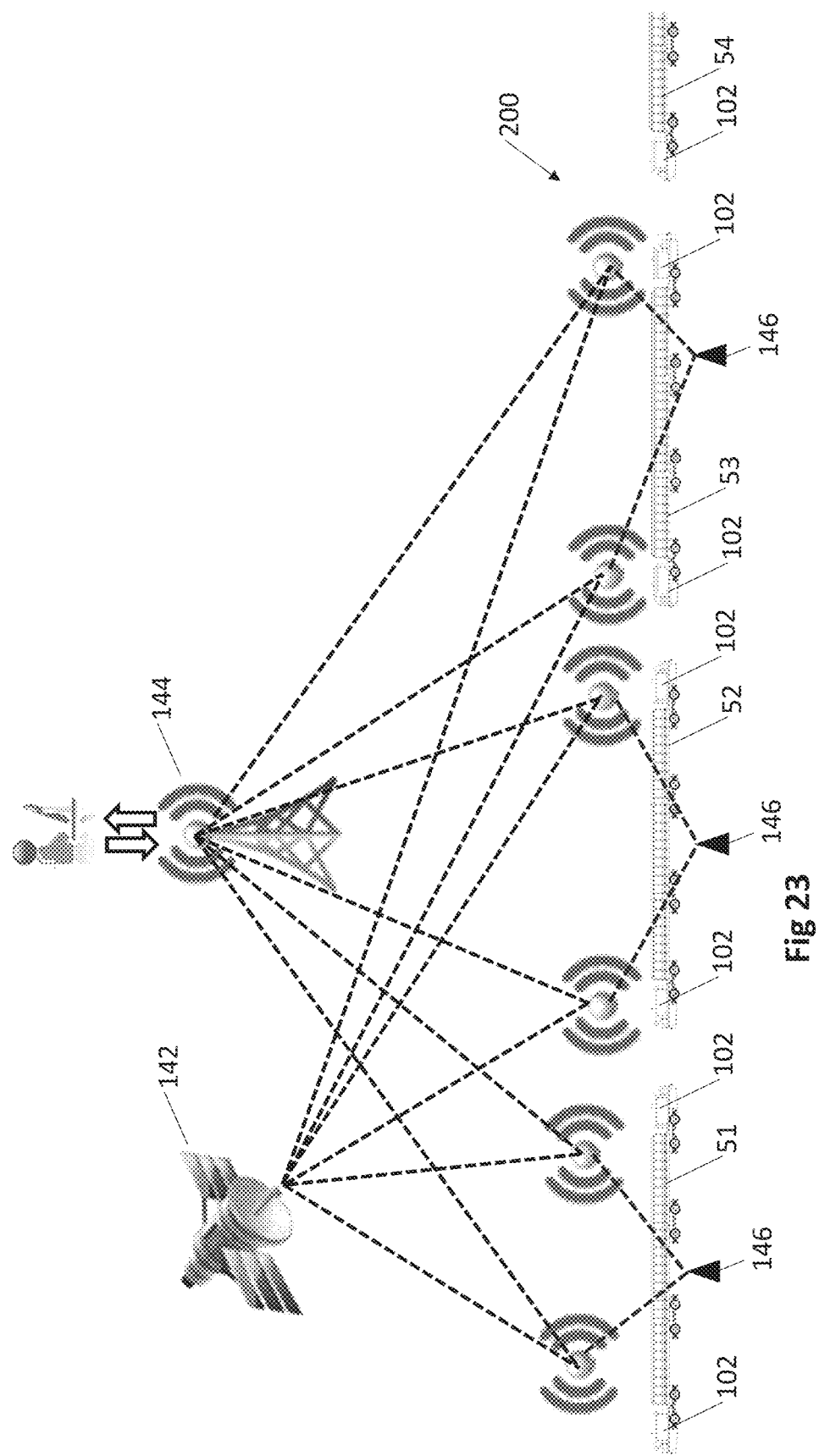
FIG. 23 is a schematic representation of a consist constructed from a plurality of the disclosed rail transport systems.

(g) Wagon position indication and control system 140. The system 140 may be provided as a software routine within the VCU 120. System 140 further communicates with the GPS 124 and GPS satellites 142. In addition the system 140 may communicate with a remote control centre 144 via radio or internet communications. The system 140 may also communicate with other information or monitoring systems and devices such as track interface units 146 and other wayside equipment and/or track circuits (shown in FIGS. 22 & 23). In general terms the wagon position indication and control system 140 enables the dynamic determination of the position of the vehicle 102 relative to a reference location. This may utilise both GPS information and information received from the track interface units 146 and indeed on board equipment such as wheel tacos. The position is communicated by the telemetry system 122 to the control centre 144. A controller in the remote control system 144 may also download or transfer position information to the system 140 for instructing the route for the vehicle 102.

(h) Anti-collision control system 148. The anti-collision system 148 has particular application when multiple shuttles S are operated as a mechanically uncouple consist. Thus a consist can be constructed from multiple shuttles S which are mechanically uncoupled from each other but are operated to travel together. The spacing between adjacent shuttles S may be controlled to be within a set range by both the GPS 124 in the rail vehicles 102 and the anti-collision control system 148. The system 148 may be provided as a software routine within the VCU 120 or as a separate module or unit which is supported by the truck 58a and in communication with the VCU 148. The anti-collision control system 148 obtains information from the proximity sensors 126. From this the system 148 is able to determine the spacing between vehicles 102 in adjacent shuttles S. Information on the spacing between adjacent shuttles S can then be relayed to the VCU 120 which may vary the speed of its corresponding vehicles 102 to maintain a predetermined spacing or separation with the adjacent shuttle S. This may be achieved for example by either accelerating or decelerating the vehicles 102. In this regard the VCU 120 can instruct other controllers or systems to, for example, increase the speed of the drive motor 20 via the system 132; or to decelerate the vehicle by application of the regenerative brake via the regenerative brake controller 138; or by application of the mechanical brake 74 using the brake controller 136.

(i) ABS braking system 150. The ABS 150 may be provided as a software routine within the VCU 120 or as a standalone unit or system which is supported by the truck 58a and in communication with the VCU 120 and the mechanical brake controller 136 and thus the mechanical brake 74. The ABS 150 may be in accordance with known systems presently utilised on road vehicles.

(j) Traction control system 152. The traction control system 152 may be provided as a software routine embedded within the VCU 120 or as a standalone unit supported by the truck 58a and in communication with the VCU 120. The traction control system 152 monitors wheel slip. In the event that wheel slip is detected the VCU 120 may optionally control either the mechanical brake controller 136, or the regenerative brake controller 138 to brake the slipping wheel thereby reducing the slip; or indeed operate the drive motor control system 132 to reduce the torque provided to the slipping wheel.

From the above it will be appreciated that the vehicles 102 and shuttles S are self-powered and in this particular embodiment arranged to carry bulk commodities. There is no need for the provision of a traditional coupled loco to provide motive force to the shuttle S. As the wheels 18 are able to rotate at different speeds there is no need to rely on wheel rail riding in order to enable the trucks 58, rail will transport system 10, vehicles 102 or shuttle S to traverse a bend. This in itself has significant advantages both in the manufacture of the wheels 18, but also in terms of traction between the wheels 18 and the rails on which they run so as to reduce wear of both.

The telemetry system 122 enables each vehicle 102/shuttle S to communicate with the remote control centre 144. This enables remote control of the vehicle 102/shuttle S. Additionally the VCU 120 enables autonomous driving of the vehicle 102/shuttle S in accordance with either preloaded guidance information or dynamic information provided via the control centre 144. Fuel efficiency is enhanced by the provision of the range extender system 118 and the use of regenerative braking systems. In particular the regenerative braking system enables charging of the battery pack 106 during braking events.

Also, the VCU 120 may be arranged to place one or indeed both of the vehicles 102 in a freewheeling state where no power is provided by the rechargeable battery 106 to the motors 104 in certain situations for example when travelling along a decline, or in the event of the detection of a particular fault. It is further possible to arrange the motors 104 to act as generators to provide charge for the battery pack 106 when travelling down a decline.

The telemetry system 122 enables the vehicle(s) 102/shuttle S to communicate not only with the remote control centre 144 but also with other like rail vehicles 102 and shuttles S which are either adjacent or in a common consist. This enables the assembly of a consist in which a plurality of shuttles S may travel a common route and be maintained a certain distance apart but are physically uncoupled from each other. This is shown for example in FIG. 23 which depicts a consist 200 comprising a plurality of uncoupled shuttles S1, S2, S3 and S4.

In the consist 200 the rail vehicles 102 and thus the corresponding consists S1-S4 are synchronised to maintain their relative position or spacing within the consist 200 while the consist 200 is moving. This may be achieved for example by use of the wagon position indication and control system 140 of mutually adjacent vehicles 102 of respective adjacent consists 200 monitoring their position relative to a common reference so that each of the mutually adjacent vehicles 102 are maintained at predetermined separation in the moving consist 200. This relies on the use of the respective GPS 130 of the vehicles 102.

For example when assembling the consist 200 it may predetermined that an optimal separation distance or spacing between each of the shuttles S is one metre. The route of the consist 200 is predetermined or known. Therefore at any one time the position of any one vehicle 102 of one shuttle S relative to another vehicle 102 in another shuttle is predetermined. These positions are monitored dynamically and compared with the predetermined or expected positions at any point along the route of travel of the consist 200. If a discrepancy is noted between the dynamically determined positions and the expected positions then a VCU 120 of a particular vehicle 102 may operate to either accelerate or decelerate the corresponding shuttles S in order to restore the predetermined separation distance.

Thus there is an expectation that the actual spacing between adjacent shuttles S may modulate during the transit of the consist 200 about a predetermined separation distance. In the event that a VCU 120 determines that its corresponding shuttle S should be decelerated, the VCU 120 may be programmed to preferentially apply the regenerative braking system rather than the mechanical braking system. This increases fuel efficiency as deployment of the regenerative recharges the battery pack 108. However if the diagnosis system indicates a fault in the regenerative braking system then the VCU 120 may operate to control or operate the mechanical brake 74.

In addition to controlling the relative position of the vehicles 102/shuttles S in a moving consist 200 information may also be obtained from the proximity sensors 126 to enable the VCU 120 of adjacent vehicles 102 of respective adjacent shuttles S to operate in a manner to maintain the predetermined separation distance. This relies on measurement or sensing of spacing directly between adjacent vehicles 102 of respective adjacent shuttles S rather than, or in addition to, relying on the position of the shuttles S relative to a common reference which is determined via the GPS.

Providing a space in between adjacent shuttles S in the moving consist 200 also assists in eliminating shunting when traversing a bend. This is beneficial in reducing the likelihood of derailment.

FIGS. 24 and 25 illustrate an alternate form of rail transport shuttle Sa. The shuttle Sa incorporates substantive aspects of the shuttle S described above, namely a body 12, the two driven/powered rail vehicles 102, and the coupling system 14. The main difference is that the shuttle Sa the continuous load carrying structure is constituted by a single body 12 only which is coupled at opposite ends to respective driven rail vehicles 102. The body 12 is provided with a flexible liner 18. The entire load of the body 12 and any payload therein is fully transferred to the two rail vehicles 102. The benefits of the articulated coupling system 14 without linear play or slack are enjoyed by the shuttle S. Also as is readily apparent the shuttle Sa is able to travel in opposite directions on a rail without the need to turn the body 12, thus eliminating the need for sidings. A plurality shuttles Sa may also be constructed into and run as a mechanically decoupled consist in the same manner as describe above in relation to the shuttle S.

Figure 26:
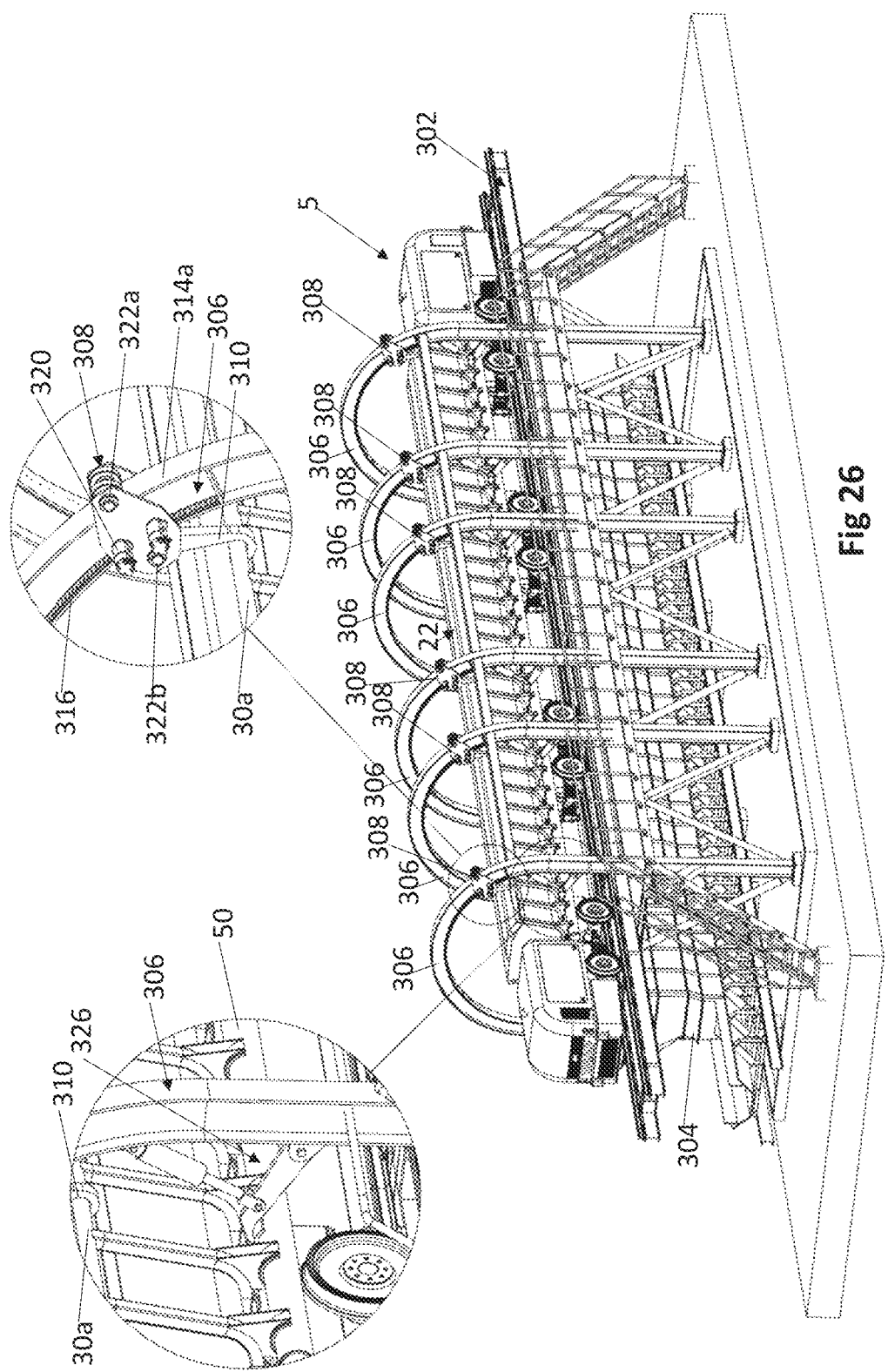
FIG. 26 is a schematic representation of the disclosed shuttle at an unloading facility.
Figure 27:
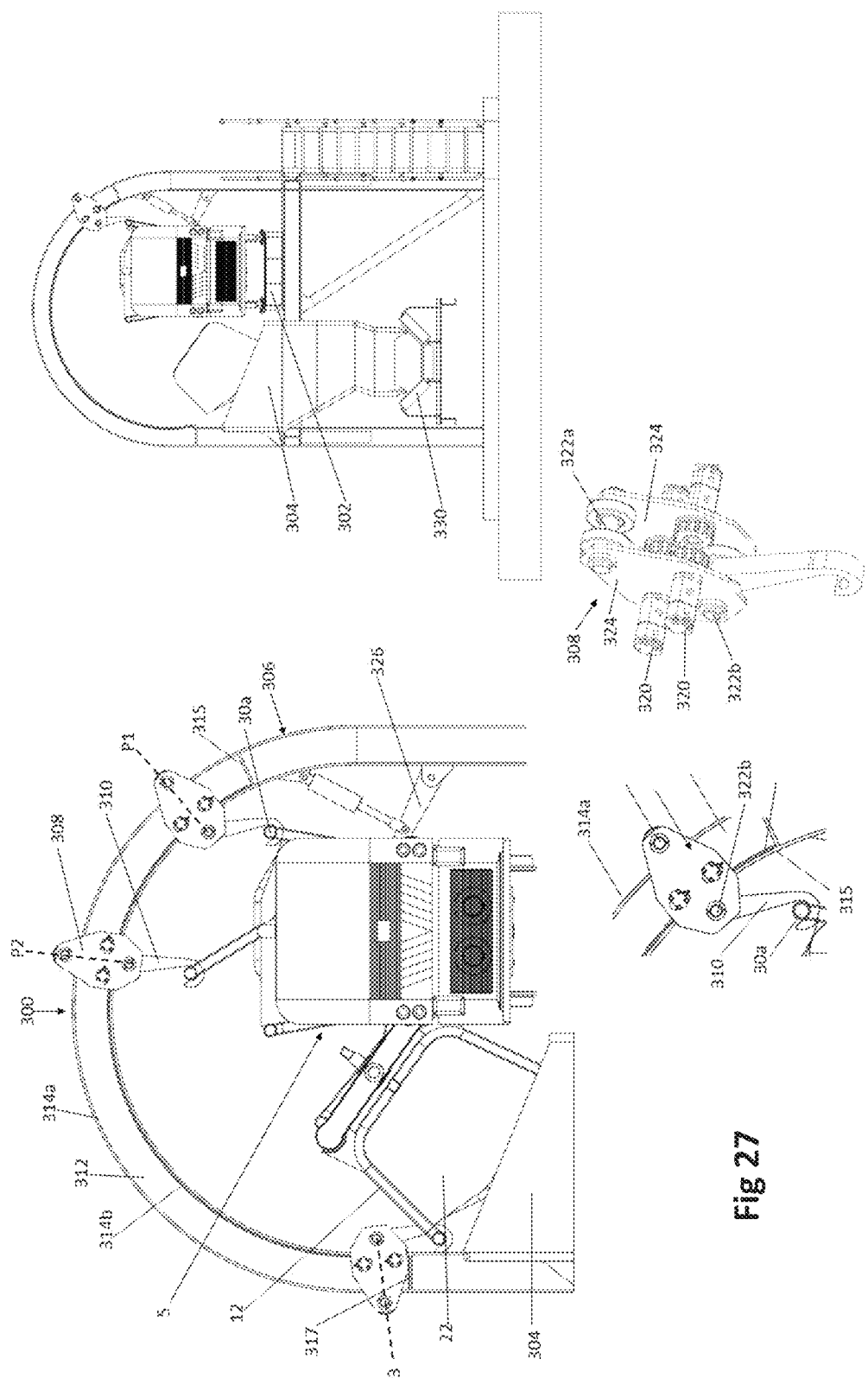
FIG. 27 is a schematic representation of the unloading process of the shuttle at the unloading facility shown in FIG. 26.

FIGS. 26 and 27 illustrate one form of off-loading facility 300 for offloading the payload of a shuttle S (including a shuttle Sa, but for simplicity reference is made herein after in relation to the shuttle S only). The facility 300 comprises an elevated track 302 to support a shuttle S above and to the side of a hopper 304. The hopper 304 is of a length equal to or greater than the continuous load carrying structure 22. The facility 300 includes a plurality of overhead curved beams or gantries 306 each of which supports a driven trolley 308 with a pivotally coupled hook 310. In this embodiment the there are two spaced apart beams 306 for each body 12. The beams have an I profile with a central web and 312 and upper and lower flanges 314a and 314b. A rack 316 is provided on the lower flange 314b on each side of the web 312. Each rack extends from a first end 315 distant the hopper 304 through an arc of about 160° to a second end 317 adjacent the hopper 304.

The trolley 308 is provided with four pinions 318, two on each side to engage with each rack 316. The pinions 318 are driven by hydraulic motors 320. Idler wheels 322a and 322b are provided on the trolley 308 and run on the outer surfaces of the flanges 314a and 314b respectively. The pinions 318 and idler wheels 322 are couped to opposed plates 324 of the trolley 308. The hook 310 is able to swing about the axle of the idler wheel 322b.

The trollies have a retracted position where they located at the first end 315 of a respective beam 306 and an unload position where they are travelled along the racks 316 to the second end 317. When in the retracted position the hooks 310 are located below and to the side of the upper rail 30a of the bodies 12 of an adjacent shuttle S.

A hold down arm 326 is supported on each beam 306 on a side distant the hopper 304. Each hold down arm 326 is pivoted by a hydraulic ram between an hold down position where it bear on the beam 50 to hold down the shuttle S during unloading and a retracted position where the arm 326 is retracted from the beam 50.

In order to unload a laden shuttle S the trollies 308 and the arms 326 are placed in their respective retracted positions. This enables a shuttle S to be driven along the track 302 to an unloading location adjacent the hopper 304. Next the arms 326 are placed in their hold down position to bear on the beams 50. The hydraulic motors 320 are activated to cause the trollies 308 to travel along the racks 316 toward the second end 317. After about 15° of travel the hooks 310 pick up the upper rail 30a of the bodies 12. This is shown as position P1 in FIG. 27. As the trollies continue their travel along the racks 316 they pivot the bodies 12 about their beams 46 to swing the corresponding load carrying structure 22 toward the hopper 304 as exemplified at position P2 in FIG. 27. Eventually the load carrying structure 22 is placed in the unload position P3 when the trollies reach the second end 317. The shuttles S is prevented from tipping due to the change in weight distribution as the load carrying structure 22 is progressively swung and unloaded by the virtue of the arms 326 bearing on the beams 50.

A belt conveyor 330 is located under the hopper 304 to carry the unloaded payload from the shuttle S to another location. After unloading the hydraulic motors 320 are reversed causing the trollies 308 to run along the racks 316 back to the first end 315 progressively swing the load carrying structure 22 back to its transport position shown in FIGS. 1a and 3. The arms 326 are retracted and the shuttle S is able to be driven away.

Whilst a specific embodiment of the rail transport system 10 has been described, it should be appreciated that the system may be embodied in many other forms. For example the system 10 is described as being used in conjunction with two driven or powered rail vehicles 102 to form a shuttle S. The rail vehicles 102 in the shuttle S are self-powered and have control systems to enable autonomous or remote control. However in alternative embodiments the rail transport system 10 may be coupled to a conventional loco, or conventional lead and trailing loco to form a shuttle having the same continuous load carrying structure 22.

Also the coupling system 14 may take other forms which provide three axis rotational articulation such as an articulating turntable. Thus it is not critical for the coupling system to incorporate the spherical bush arrangement 76 described above.

Additionally the trucks 58 in the described embodiment each have two axles 16. However in an alternate embodiment the truck could be provided with only a single centrally located axle 16. In such an embodiment the trucks will arrange to couple to two bodies 12 and will thus carry parts of two coupling systems one on each side of the axle 16 to facilitate coupling of the two bodies. Further in all aspects and embodiments it is possible to provide one or more of the trucks 58 with one or more motors to provide drive (and thus traction) to the respective wheels of the truck 58. The motors may be electric motors provided with power either from on board battery packs or via electric cables/bus bars connectable to the battery packs 106 of the rail vehicles 102.

When the trucks 58 are provided with one or more electric motors 104, the following drive combinations are possible for transferring torque from the motors to the wheels 18 on that rotate about a common axis:

One or more low voltage DC motors with or without a reduction gearbox coupled to a differential 72;

One or more low voltage AC motors with or without a reduction gearbox coupled to a differential 72;

One or more high voltage DC motors with or without reduction a gearbox coupled to a differential 72;

One or more high voltage AC motors with or without reduction a gearbox coupled to a differential 72;

respective electric motors (AC or DC and high voltage or low voltage), with or without reduction gearboxes, mounted to directly drive respective wheels 18, where motor speed can be individually controlled to enable wheels on a common rotation axis to rotate at different speed without the need for a differential. Indeed this direct drive non differential system may also be implemented using other types of motors such as hydraulic motors. Moreover the direct drive non differential system may also be incorporated in the powered vehicles 102 and associated trucks 58a in place of the differential drive system.

Figure 28:
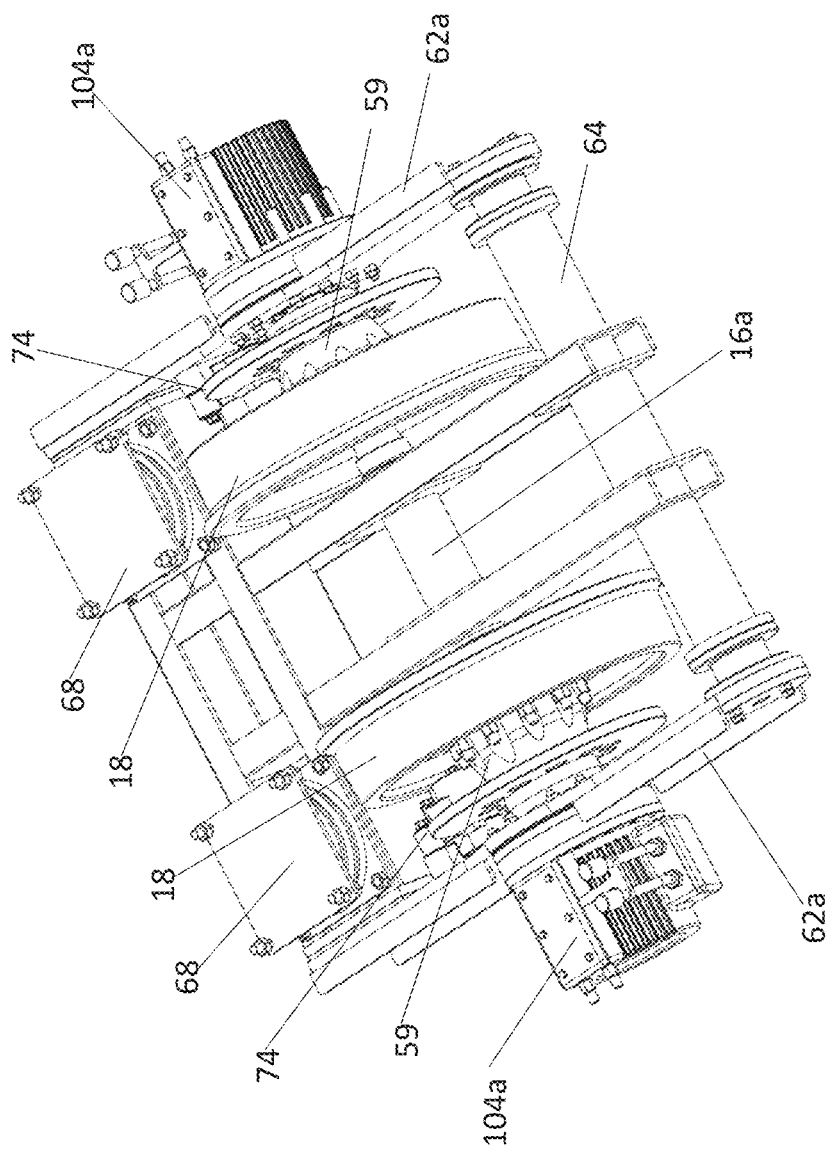
FIG. 28 is a schematic representation of an embodiment of the portion of a truck incorporated in the rail transport system having an alternate drive arrangement for the wheels.

FIG. 28 is a schematic representation of a portion of a truck 58a or a powered rail vehicle 102 where each wheel 16 is driven by a separate and independent electric motor 104a. The wheels 18 are mounted on a common fixed axle 16a via respective bearing assemblies 59. This allows the two opposite wheels 18 on the same shaft 16a to rotate at different (e.g. for a bend) or synchronised (for a straight) RPMs by independently controlling the wheel motors 104a. This achieves a similar result to a differential and is known as front wheel vectoring. In this embodiment the electric motors 104a are mounted on the outside of the two wheels 18. This enable the wheels 18 to be closer together than in other embodiments to thereby reduce the track gauge by about 50%. For example the embodiments of the rail transport system 10 shown in FIGS. 1-20, 24 and 25 may run on narrow gauge tracks (1067 mm), whereas an embodiment of the rail transport system 10 incorporating the portion of the truck 58a shown in FIG. 28 may run on a super narrow gauge track (590 mm). This has advantages in terms of a lower cost of construction of the tracks and having a tighter turning radius; and also potentially avoiding various statutory regulations. For example in Australia super narrow gauge rail transport systems are exempt from Office of the National Rail Safety Regulator accreditation and are governed by the Department of Minerals and Petroleum which set operational regulations similar to a belt conveyor.

In a further embodiment the flexible liner 20 need not be made as a single one piece article that continuously spans all of the coupling systems 14. Rather the flexible liner may be made as a number of individual pieces which when coupled together continuously span the coupling systems 14. For example each liner piece may have a length which is longer than the length of a body 12 to enable overlapping of the pieces across the couplings 14 thereby in combination presenting a continuous end to end liner for the shuttle S.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the rail transport system as disclosed herein.

What is claimed is:

1. A rail transport shuttle comprising:
a load carrying structure having at least one load carrying body and a flexible liner supported by the at least one load carrying body;
first and second powered rail vehicles;
first and second coupling systems, wherein the first powered rail vehicle is coupled to one end of the load carrying structure by the first coupling system and the second powered rail vehicle is coupled to a second opposite end of the load carrying structure by the second coupling system;
the first and second powered rail vehicles arranged to enable the rail transport system to be driven in opposite directions without turning of the single load carrying body; and
wherein each coupling system is an articulating coupling system being configured to provide three degrees of rotational freedom between the opposite ends of the load carrying structure and the first and second powered rail vehicles and wherein at least one of the first and second coupling systems further comprises a control mechanism operable to dampen or lockout at least one of the three degrees of rotational freedom.

2. The rail transport shuttle according to claim 1 wherein each coupling system further comprises a locking pin arranged to lock the opposite ends of the load carrying structure from motion in a vertical direction relative to the rail vehicles.

3. The rail transport shuttle according to claim 1 wherein each coupling system comprises a pin connected to the body and a bush arrangement for receiving a respective pin.

4. The rail transport shuttle according to claim 1 wherein the load carrying structure comprise two or more load carrying bodies arranged end to end, and one or more trucks; each truck having two axles and two couplings.

5. The rail transport shuttle according to claim 4 wherein adjacent ends of mutually adjacent bodies are coupled to a common truck in a configuration wherein at least one axles is located below one of the mutually adjacent bodies and another axle is located below the other of the mutually adjacent bodies.

6. The rail transport system according to claim 4 wherein each truck comprises two bush arrangements.

7. The rail transport system according to claim 6 wherein the two bush arrangements are located between two of the at least two axles.

8. The rail transport shuttle according to claim 4 comprising a flexible liner supported by the two or more bodies and is configured to span respective coupling systems coupling mutually adjacent bodies to form a continuous load carrying structure.

9. The rail transport shuttle according to claim 8 wherein each body comprises a liner support structure in which the flexible liner is received, the liner support structure being open at respective opposite ends to enable the flexible liner to extend beyond at least mutually adjacent ends of respective liner support structures.

10. The rail transport shuttle according to according to claim 4 wherein each truck comprises at least one motor for driving wheels on each of axle of the truck.

11. The rail transport system according to claim 10 wherein each truck comprises a motor for each wheel on a common axle wherein the motors are controlled independently of each other thereby enabling the wheels on the common axle to rotate at the same or different speeds.

12. The rail transport shuttle according to claim 1 wherein the load carrying structure comprise a single load carrying body and wherein the first powered rail vehicle is coupled to one end of the single load carrying body by the first coupling system and the second powered rail vehicle is coupled to a second opposite end of the single load carrying body by the second coupling system and wherein the full load of the single load carrying body and any payload held therein is transferred to first and second powered rail vehicles.

13. The rail transport shuttle according to claim 1 wherein each of the first and second powered rail vehicles have a first axle and a second axle, each axle having a rail wheel at each opposite end; and a single bush arrangement located between the first axle and the second axle.

14. The rail transport shuttle according to claim 13 wherein each of the first and second powered rail vehicles comprises at least one electric motor for driving the rail wheels of the powered rail vehicles wherein the wheels on opposite ends of an axle are able to rotate at different speeds.

15. The rail transport shuttle according to claim 14 wherein each powered rail vehicle comprises a battery pack for powering the electric motor.

16. The rail transport shuttle according to claim 1 wherein each of the first and second rail powered vehicles is provided with a control system arranged to enable autonomous driving of the rail transport shuttle.

17. A rail transport system comprising:
at least two load carrying bodies arranged end to end, wherein mutually adjacent bodies are capable of being coupled together by a respective coupling system;
a plurality of axles each provided with a rail wheel at each end on which the at least two bodies are supported; and
a flexible liner supported by the at least two bodies and configured to span respective coupling systems coupling mutually adjacent bodies to form a continuous load carrying structure;
wherein each coupling system is an articulating coupling system being configured to provide three degrees of rotational freedom between opposite ends of the continuous load carrying structure and first and second powered rail vehicles; and
wherein each coupling system further comprises a control mechanism operable to dampen or lockout at least one of the three degrees of rotational freedom.

18. The rail transport system according to claim 17 wherein each body comprises a liner support structure in which the flexible liner is received, the liner support structure being open at respective opposite ends to enable the flexible liner to extend beyond at least mutually adjacent ends of the liner support structure.

19. The rail transport system according to claim 17, wherein the control mechanism of each coupling system is operable to dampen or lockout the three degrees of rotational freedom.

20. A rail transport shuttle comprising: a single load carrying body; first and second powered rail vehicles each vehicle having at least two axles; and first and second coupling systems, wherein the first driven rail vehicle is coupled to one end of the single load carrying body by the first coupling system and the second driven rail vehicle is coupled to a second opposite end of the single load carrying body by the second coupling system; the first and second rail vehicles arranged to enable the rail transport system to be driven in opposite directions without turning of the single load carrying body, and wherein the full load of the single load carrying body and any payload held therein is transferred to first and second driven rail vehicles; wherein each coupling system is an articulating coupling system being configured to provide three degrees of rotational freedom between mutually coupled bodies or mutually coupled bodies and rail vehicles, each coupling system having a pin on the load carrying body and a bush located between the axles on each vehicle in which the pin can be received, and wherein each of the first and second coupling systems further comprises a control mechanism operable to dampen or lockout at least one of the three degrees of rotational freedom.

21. The rail transport system according to claim 20, wherein the control mechanism of each coupling system is operable to dampen or lockout the three degrees of rotational freedom.

22. A rail transport shuttle comprising:
a load carrying structure having at least one load carrying body and a flexible liner supported by the at least one load carrying body;
first and second powered rail vehicles;
first and second coupling systems, wherein the first powered rail vehicle is coupled to one end of the load carrying structure by the first coupling system and the second powered rail vehicle is coupled to a second opposite end of the load carrying structure by the second coupling system;
the first and second powered rail vehicles arranged to enable the rail transport system to be driven in opposite directions without turning of the single load carrying body; and
wherein each coupling system is an articulating coupling system being configured to provide three degrees of rotational freedom between the opposite ends of the load carrying structure and the first and second powered rail vehicles; and
wherein each coupling system further comprises a control mechanism operable to dampen or lockout at least one of the rotational degrees of freedom.

* * * * *